(12) United States Patent
Demuth et al.

(10) Patent No.: US 10,953,595 B2
(45) Date of Patent: Mar. 23, 2021

(54) WATER SOLUBLE SUPPORT MATERIALS FOR HIGH TEMPERATURE ADDITIVE MANUFACTURING APPLICATIONS

(71) Applicant: Stratasys, Inc., Eden Prairie, MN (US)

(72) Inventors: Benjamin A. Demuth, River Falls, WI (US); Adam R. Pawloski, Lake Elmo, MN (US)

(73) Assignee: Stratasys, Inc., Eden Prairie, MN (US)

( * ) Notice: Subject to any disclaimer, the term of this patent is extended or adjusted under 35 U.S.C. 154(b) by 128 days.

(21) Appl. No.: 16/064,286

(22) PCT Filed: Dec. 20, 2016

(86) PCT No.: PCT/US2016/067818
§ 371 (c)(1),
(2) Date: Jun. 20, 2018

(87) PCT Pub. No.: WO2017/112689
PCT Pub. Date: Jun. 29, 2017

(65) Prior Publication Data
US 2018/0370121 A1    Dec. 27, 2018

Related U.S. Application Data

(60) Provisional application No. 62/387,447, filed on Dec. 24, 2015.

(51) Int. Cl.
*B29C 64/40* (2017.01)
*B29C 64/118* (2017.01)
(Continued)

(52) U.S. Cl.
CPC ............ *B29C 64/118* (2017.08); *B29C 64/40* (2017.08); *B33Y 70/00* (2014.12); *C08F 226/10* (2013.01);
(Continued)

(58) Field of Classification Search
None
See application file for complete search history.

(56) References Cited

U.S. PATENT DOCUMENTS

| 3,892,905 A | * | 7/1975 | Albert | ............... C08L 29/04 428/220 |
| 4,863,538 A | | 9/1989 | Deckard | |

(Continued)

FOREIGN PATENT DOCUMENTS

| GB | 1312034 A | 4/1973 |
| WO | 00/62994 A1 | 10/2000 |

(Continued)

OTHER PUBLICATIONS

International Search Report and Written Opinion dated Mar. 21, 2017 for corresponding International Application No. PCT/US2016/067818, filed Dec. 20, 2016.

(Continued)

*Primary Examiner* — Cachet I Proctor
(74) *Attorney, Agent, or Firm* — Peter J. Ims; Westman, Champlin & Koehler, P.A.

(57) ABSTRACT

A polymeric blend includes a blend of polyvinylpyrrolidone (PVP) polymers. The polymeric material includes a blend of at least two PVP polymers wherein at least one of the PVP polymers has an average molecular weight of about 40,000 daltons or greater. The support material can be thermally stable at temperatures above 80° C. The support material is disintegrable in aqueous solutions such as tap water.

17 Claims, 15 Drawing Sheets

(51) Int. Cl.
  *B33Y 70/00* (2020.01)
  *C08L 39/06* (2006.01)
  *C08F 226/10* (2006.01)
  *B33Y 10/00* (2015.01)
  *B29K 105/00* (2006.01)
  *C08F 220/18* (2006.01)

(52) U.S. Cl.
  CPC .......... *C08L 39/06* (2013.01); *B29K 2039/06* (2013.01); *B29K 2105/258* (2013.01); *B33Y 10/00* (2014.12); *C08F 220/18* (2013.01)

(56) References Cited

U.S. PATENT DOCUMENTS

| | | | |
|---|---|---|---|
| 5,080,809 | A | 1/1992 | Stahi et al. |
| 5,121,329 | A | 6/1992 | Crump |
| 5,132,143 | A | 7/1992 | Deckard |
| 5,204,055 | A | 4/1993 | Sachs et al. |
| 5,503,785 | A | 4/1996 | Crump et al. |
| 6,004,124 | A | 12/1999 | Swanson et al. |
| 6,790,403 | B1 | 9/2004 | Priedeman, Jr. et al. |
| 7,122,246 | B2 | 10/2006 | Comb et al. |
| 7,384,255 | B2 | 6/2008 | LaBossiere et al. |
| 7,604,470 | B2 | 10/2009 | LaBossiere et al. |
| 7,625,200 | B2 | 12/2009 | Leavitt |
| 7,896,209 | B2 | 3/2011 | Batchelder et al. |
| 8,133,504 | B2 | 3/2012 | Kettlewell et al. |
| 8,153,182 | B2 | 4/2012 | Comb et al. |
| 8,186,415 | B2 * | 5/2012 | Marutani .................. B22C 9/00 164/4.1 |
| 8,221,669 | B2 | 7/2012 | Batchelder et al. |
| 8,221,858 | B2 | 7/2012 | Mannella et al. |
| 8,236,227 | B2 | 8/2012 | Batchelder et al. |
| 8,246,888 | B2 | 8/2012 | Hopkins et al. |
| 8,419,996 | B2 | 4/2013 | Swanson et al. |
| 8,459,280 | B2 | 6/2013 | Swanson et al. |
| 8,647,102 | B2 | 2/2014 | Swanson et al. |
| 8,658,250 | B2 | 2/2014 | Batchelder et al. |
| 9,138,981 | B1 | 9/2015 | Hirsch et al. |
| 10,343,301 | B2 | 7/2019 | Gunther et al. |
| 2007/0286891 | A1 | 12/2007 | Kettlewell et al. |
| 2010/0096072 | A1 * | 4/2010 | Hopkins ................. B29C 64/40 156/155 |
| 2010/0283172 | A1 | 11/2010 | Swanson et al. |
| 2011/0074065 | A1 | 3/2011 | Batchelder et al. |
| 2011/0186081 | A1 | 8/2011 | Dunn et al. |
| 2012/0070523 | A1 | 3/2012 | Swanson et al. |
| 2012/0070619 | A1 | 3/2012 | Mikulak et al. |
| 2012/0164256 | A1 | 6/2012 | Swanson et al. |
| 2012/0231225 | A1 | 9/2012 | Mikulak et al. |
| 2013/0077996 | A1 | 3/2013 | Hanson et al. |
| 2013/0077997 | A1 | 3/2013 | Hanson et al. |
| 2013/0161439 | A1 | 6/2013 | Beery et al. |
| 2013/0161442 | A1 | 6/2013 | Mannella et al. |
| 2013/0186549 | A1 | 7/2013 | Comb et al. |
| 2013/0186558 | A1 | 7/2013 | Comb et al. |
| 2013/0317164 | A1 | 11/2013 | Hermes et al. |
| 2013/0333798 | A1 | 12/2013 | Bosveld et al. |
| 2015/0306822 | A1 * | 10/2015 | Hirata .................... B33Y 70/00 428/327 |
| 2015/0375419 | A1 | 12/2015 | Gunther et al. |
| 2016/0194492 | A1 * | 7/2016 | Smith, Jr. .............. B33Y 70/00 525/57 |
| 2017/0057176 | A1 | 3/2017 | Hermant et al. |
| 2018/0222082 | A1 | 8/2018 | Gunther et al. |
| 2018/0370120 | A1 | 12/2018 | Pawloski et al. |

FOREIGN PATENT DOCUMENTS

| | | | | |
|---|---|---|---|---|
| WO | 2006013337 | A2 | 2/2006 | |
| WO | 2014131388 | A1 | 9/2014 | |
| WO | WO-2015012862 | A1 * | 1/2015 | ............ B29C 64/40 |
| WO | 2015124557 | A1 | 8/2015 | |
| WO | 2017112687 | A1 | 6/2017 | |
| WO | 2017112689 | A1 | 6/2017 | |

OTHER PUBLICATIONS

U.S. Patent Office issued prosecution for U.S. Appl. No. 16/064,275, filed Jun. 20, 2018, including: Non-Final Rejection dated Jul. 6, 2020, 8 pages; Restriction Requirement dated May 19, 2020, 6 pages; 14 pages total.

International Search Report and Written Opinion dated Apr. 19, 2017 for corresponding International Application No. PCT/US2016/067815, filed Dec. 20, 2016.

U.S. Patent Office issued prosecution for U.S. Appl. No. 16/064,275, filed Jun. 20, 2018, including: Final Rejection dated Dec. 8, 2020.

* cited by examiner

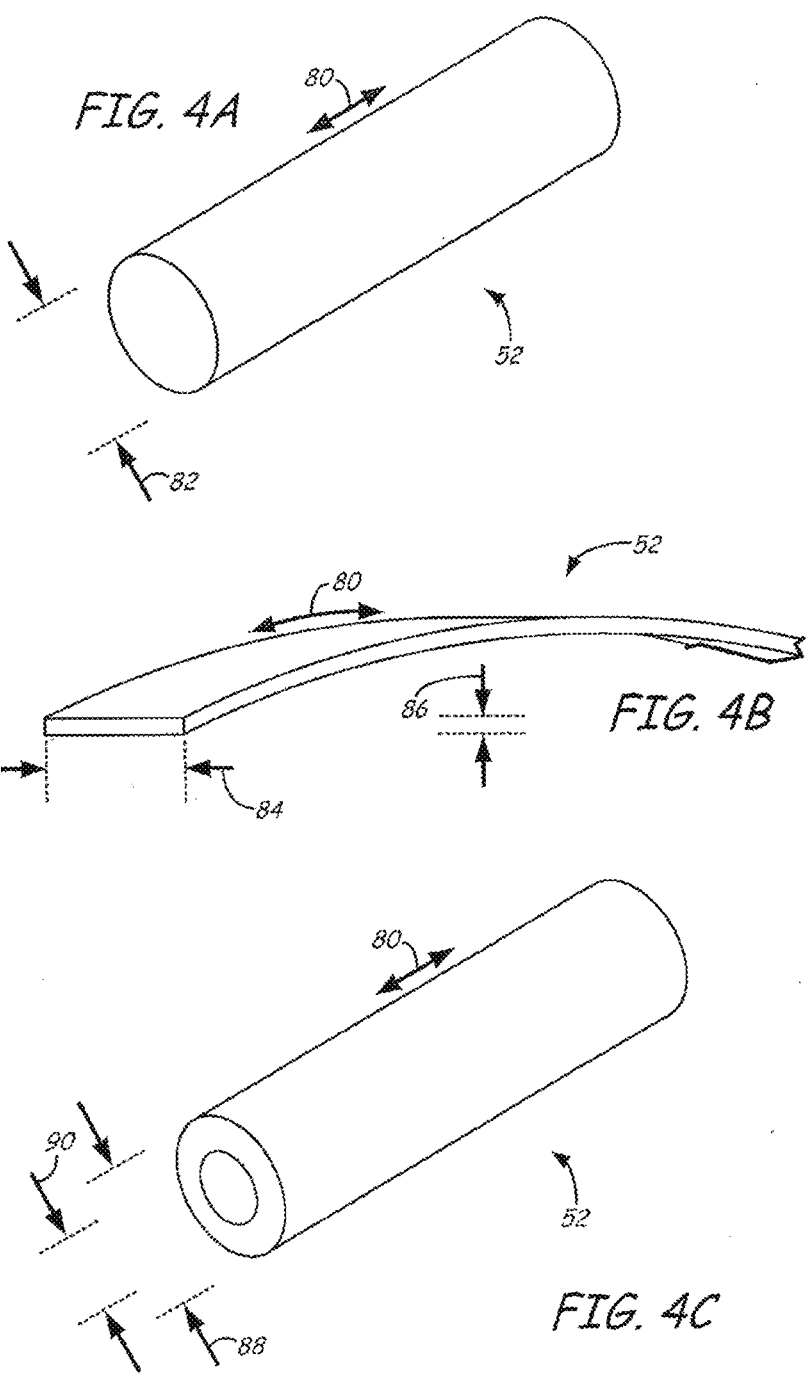

WATER SOLUBLE SUPPORT MATERIALS FOR HIGH TEMPERATURE ADDITIVE MANUFACTURING APPLICATIONS

CROSS-REFERENCE TO RELATED APPLICATION(S)

This Application is a 371 National Stage Application of International Application No. PCT/US2016/067818, filed on Dec. 20, 2016, published as International Publication No. WO2017/112689, which claims priority to U.S. Patent Application No. 62/387,447, filed on. Dec. 24, 2015, the contents of which are incorporated by reference in their entireties.

BACKGROUND

The present disclosure relates to additive manufacturing systems for printing three-dimensional (3D) parts and support structures. In particular, the present disclosure relates to support materials for use in additive manufacturing systems, consumable assemblies retaining the support materials, and methods of manufacturing and using the support materials and assemblies in additive manufacturing systems to print articles.

Additive manufacturing systems are used to print or otherwise build printed parts from digital representations of the printed parts (e.g., AMF and STL format files) using one or more additive manufacturing techniques. Examples of commercially available additive manufacturing techniques include extrusion-based techniques, jetting, selective laser sintering, high speed sintering, powder/binder jetting, electron-beam melting, and stereolithographic processes. For each of these techniques, the digital representation of the printed part is initially sliced into multiple horizontal layers. For each sliced layer, a tool path is then generated, which provides instructions for the particular additive manufacturing system to print the given layer.

For example, in an extrusion-based additive manufacturing system, a printed part may be printed from a digital representation of the printed part in a layer-by-layer manner by extruding a thermoplastic material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a printed part resembling the digital representation.

In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. The host computer generates additional geometry acting as a support structure for the overhanging or free-space segments of the printed part being formed. Support material is then deposited from a second nozzle pursuant to the generated geometry during the printing process. The support material adheres to the part material during fabrication, and is removable from the completed printed part when the printing process is complete.

SUMMARY

In a first aspect, the present disclosure relates to a water soluble support material comprising a polymeric matrix. The polymeric matrix includes a plurality of polyvinylpyrrolidone (PVP) polymer species wherein the plurality of PVP polymer species includes a first PVP polymer species with a molecular weight of at least about 40,000 daltons or greater. The support material is disintegrable in an aqueous solution, e.g. water. The support material may have thermal stability in build environments of at least about 80° C. or greater. Preferably, the first PVP polymer species has an average molecular weight of about 450,000 daltons or greater, and more preferably, an average molecular weight of about 1,000,000 daltons or greater and even more preferably, an average molecular weight of about 1,450,000 daltons or greater. A second PVP polymer species of the plurality of PVP polymer species has an average molecular weight of less than about 450,000 daltons. In an exemplary embodiment, the average molecular weight of the first PVP polymer species is greater than about 450,000 daltons and the average molecular weight of the second PVP polymer species is less than about 40,000 daltons. In another exemplary embodiment, the average molecular weight of the first PVP polymer species is between about 450,000 daltons or greater and the average molecular weight of the second PVP polymer species is between about 9,000 daltons and about 450,000 daltons. The second PVP polymer species is at least about 2% to about 50% by weight of the support material. The PVP polymers may comprise between about 50% by weight and about 90% by weight of the support material. The aqueous solution may be selected from tap water and/or an aqueous solution with a pH between about pH 5 and about pH 9.

The support material may further include one or more additives. The one or more additives comprise a rheology modifier, an impact modifier, an elastomer and combinations thereof. The rheology modifier may be one of the PVP polymers, preferably the second PVP polymer species. The impact modifier may be a block copolymer impact modifier, a core-shell impact modifier, or a combination thereof. The impact modifier may be about 20% or less by weight of the support material. The elastomer can include a water soluble polyamide. The elastomer may be pre-compounded and the pre-compounded elastomer may be about 25% or less by weight of the support material. The support material has thermal stability in build environments of at least about 80° C. or greater.

In another aspect, the present disclosure includes consumable assembly with a water soluble support material comprising a polymeric matrix. The polymeric matrix includes one or more polyvinylpyrrolidone (PVP) polymer species wherein the PVP polymer species include a PVP polymer species with a molecular weight of at least about 40,000 daltons or greater and an impact modifier. The aqueous solution may be selected from tap water and/or an aqueous solution with a pH between about pH 5 and about pH 9. The support material may have thermal stability in build environments of at least about 80° C. or greater.

In yet another aspect, the present disclosure includes a water soluble support material for an additive manufacturing system having a build environment wherein the material includes a polymeric matrix with a first PVP polymer species and an impact modifier. The first PVP polymer species has an average molecular weight of about 40,000 daltons or greater and the support material is disintegrable in an aqueous solution. The support material may have thermal stability in the build environment maintained at a temperature of about 80° C. or greater. The PVP polymer species may have an average molecular weight of about 450,000 daltons or greater. The material may further comprise a second PVP polymer species having an average molecular weight of less than about 450,000 daltons, wherein the average molecular weight of the second PVP polymer species is less than the average molecular weight of the first PVP species. The material may further comprise one or more additives. The material may include one or more additives selected from a rheology modifier, an elastomer and/or combinations thereof. The aqueous solution may be selected from tap water and/or an aqueous solution with a pH between about pH 5 and about pH 9.

In a further aspect, the present disclosure includes a method for producing a soluble support material. The method includes blending one or more PVP polymer species with one or more additives to form a support material mixture, wherein the first PVP polymer species has an average molecular weight of about 40,000 daltons or greater. The method further includes forming the support material mixture into a selected media form, wherein the support material disintegrates in an aqueous solution, e.g. water. The support material may have thermal stability of least about 80° C. or greater. The media is compounded and formed into a selected media form by extrusion melt processing. The one or more optional additives include a rheology modifying polymer, an impact modifier, an elastomer and combinations thereof. The elastomer may be pre-compounded prior to addition into the support material mixture. The method can include blending at least two species of PVP polymers wherein the first PVP polymer has an average molecular weight greater than the second PVP polymer and wherein the second PVP polymer has an average molecular weight of less than about 40,000 daltons. The method may include blending the first PVP polymer species with an average molecular weight between about 450,000 daltons or greater with the second PVP polymer species having an average molecular weight of between about 9,000 daltons and about 450,000 daltons.

In yet a further aspect, the present disclosure includes a method for printing a three-dimensional part with an additive manufacturing system. The method includes providing a support material comprising a plurality of PVP polymer species wherein the first PVP polymer species has an average molecular weight of about 40,000 daltons or greater and an impact modifier, the support material provided in a media form suitable for the additive manufacturing system. The method further includes processing the support material in the additive manufacturing system with a model material wherein the build environment of the additive manufacturing system utilizes a temperature of about 80° C. or greater and wherein the support material is disintegrable in aqueous solution. The aqueous solution may be selected from tap water and/or an aqueous solution with a pH between about pH 5 and about pH 9.

DEFINITIONS

Unless otherwise specified, the following terms as used herein have the meanings provided below:

The term "polymer" refers to a polymerized molecule having one or more monomer species, and includes homopolymers and copolymers. The term "copolymer" refers to a polymer having two or more monomer species, and includes terpolymers (i.e., copolymers having three monomer species).

The terms "preferred", "preferably", "example" and "exemplary" refer to embodiments that may afford certain benefits, under certain circumstances. However, other embodiments may also be preferred or exemplary, under the same or other circumstances. Furthermore, the recitation of one or more preferred or exemplary embodiments does not imply that other embodiments are not useful, and is not intended to exclude other embodiments from the inventive scope of the present disclosure.

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyetherimide is interpreted to include one or more polymer molecules of the polyetherimide, where the polymer molecules may or may not be identical (e.g., different molecular weights and/or isomers).

The terms "at least one" and "one or more of" an element are used interchangeably, and have the same meaning that includes a single element and a plurality of the elements, and may also be represented by the suffix "(s)" at the end of the element. For example, "at least one polyetherimide", "one or more polyetherimides", and "polyetherimide(s)" may be used interchangeably and have the same meaning.

The terms "about" and "substantially" are used herein with respect to measurable values and ranges due to expected variations known to those skilled in the art (e.g., limitations and variability in measurements).

The term "providing", such as for "providing a support material", when recited in the claims, is not intended to require any particular delivery or receipt of the provided part. Rather, the term "providing" is merely used to recite parts that will be referred to in subsequent elements of the claim(s), for purposes of clarity and ease of readability.

Unless otherwise specified, temperatures referred to herein are based on atmospheric pressure (i.e. one atmosphere).

"Soluble" as referred to herein can be used interchangeably with "disintegrable" and "dissolvable" and relates to materials that disintegrate in a solution or dispersion. Upon disintegration, the support material can break apart into smaller pieces and/or particles of polymer in the solution or dispersion. Some or all of the support material may also dissolve into the solution or dispersion upon disintegration.

"Water soluble" as used herein relates to materials that dissolve in tap water that is about neutral pH. It is understood that the pH of tap water can vary depending on the municipality and as such the pH can vary between about 5 and about 9. Although these pH's are slightly basic or slightly acidic, the defining feature of the water soluble materials is that they do not require an acidic or basic solution to disintegrate and can disintegrate in water at about neutral pH, e.g. tap water.

A "species" of polyvinylpyrrolidone (PVP) polymer as used herein is defined by a particular weight average molecular weight. Thus, support material having four species of PVP polymers indicates the addition of PVP polymers of four different weight average molecular weights. "Average molecular weight" as used herein relates to a weight average molecular weight.

"High temperature build environment" as referred to herein relates to build environments of about 80° C. or greater in additive manufacturing systems.

"Heat deflection temperature" or "heat distortion temperature" (HDT) is the temperature at which a polymer sample deforms under a specified load and is as determined by the test procedure outlined in ASTM D648.

"Thermally stable" as referred to herein relates to the support material having a HDT compatible with the desired build environment such that they do not exceed their thermal-degradation kinetics thresholds or result in other chemical reactions, such as crosslinking of the polymer, that can inhibit disintegration of the support material. Degradation of the support material can lead to decomposition, production of volatile species, color change, charring and the like.

All patents, publications or other documents mentioned herein are incorporated by reference.

BRIEF DESCRIPTION OF THE DRAWINGS

FIG. 4A is a perspective view of a segment of a cylindrical filament of the support material.

FIG. 4B is a perspective view of a segment of a ribbon filament of the support material.

FIG. 4C is a perspective view of a segment of a hollow filament of the support material.

DETAILED DESCRIPTION

Figure 1:
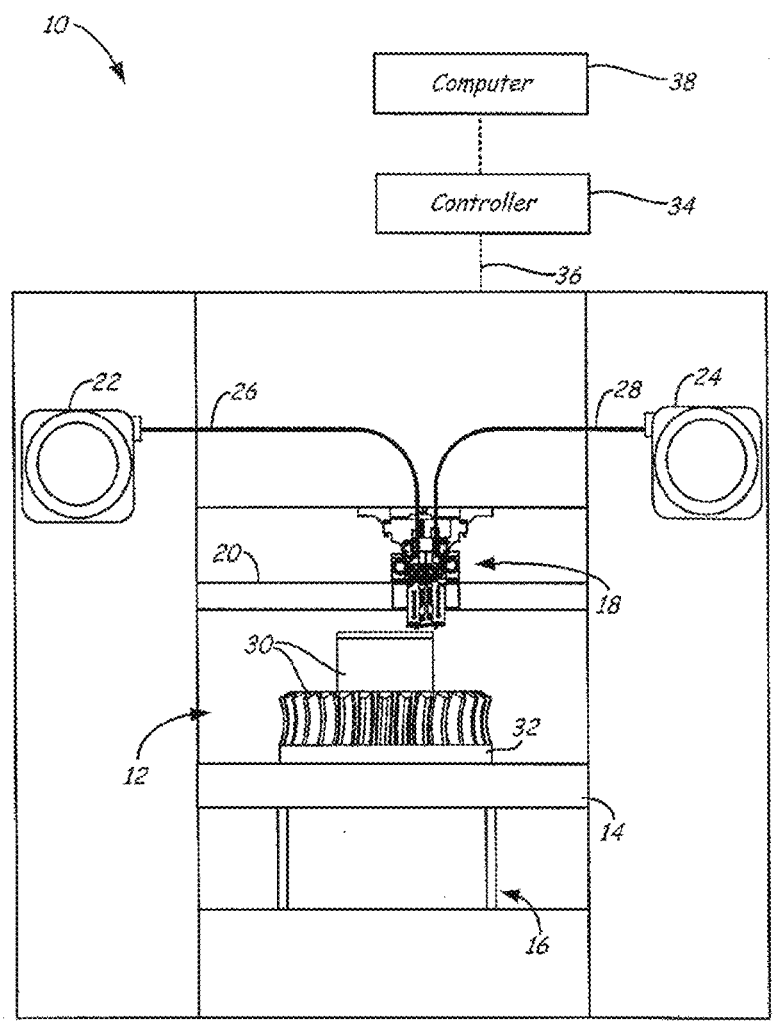
FIG. 1 is a front view of an extrusion-based additive manufacturing system configured to print printed parts and support structures, where the support structures are printed from a support material of the present disclosure.

The present disclosure is directed to a support material, and more preferably a water soluble support material. The support material can be used for printing support structures in high temperature build environments of additive manufacturing systems. The support material of the present disclosure provides improved toughness and thermal stability along with improved dissolution rates in water and/or other aqueous solutions or dispersions. Preferable support materials of the present disclosure compositionally include a polymeric matrix and may also include one or more additives that include a rheology modifying additive, an impact modifier, an elastomer and the like. The polymeric matrix can include a thermoplastic polymer or copolymer derived from polymerization of monomers of vinyl pyrrolidone. The polymeric matrix of the support material in the present disclosure generally includes polyvinylpyrrolidone (PVP). The support material may include a blend of at least two species of PVP polymers of different average molecular weights. This support material has sufficient thermal stability to withstand build environments in additive manufacturing applications of about 80° C. or greater. The support material can also be compatible with model materials in build environments of less than about 80° C.

The support material of the present disclosure functions as a sacrificial material for an associated model material. Support material can be desirable where overhanging features are required, where significant angular slopes exist in the printed parts and where it is essential to also preserve delicate features in the printed part, such as small orifices or controlled pore structures, and in some situations, to laterally encase the printed part.

Once the part has been printed, the support structure of the support material may be removed to reveal the completed printed part without damaging any of the critical or delicate geometrical features of the printed part. To accomplish this removal, the disclosed support material is dissolvable in aqueous solutions, allowing the support structure to be at least partially and typically completely dissolved away from the printed part.

In order to effectively print a support structure in a layer-by-layer manner in coordination with a printed part, the support material preferably has a glass transition temperature that is similar to that of the model material. This allows the part and support materials to have similar heat deflection temperatures and other thermal characteristics when printed together as a material pair. For example, similar glass transition and heat deflection temperatures allow the part and support materials to be printed together in the same heated environment while preventing excessive distortions and curling.

Soluble support materials that have traditionally been paired with model materials suitable in high temperature build environments, such as acrylonitrile-butadiene-styrene (ABS) model materials, which typically have glass transition temperatures around 105° C. have been soluble in, for example, basic solutions. Disintegration of the support materials in basic solutions results in caustic waste that requires time and money for disposal and also concerns about safety. Typical water soluble support materials are not thermally stable and cannot be melt processed at the higher melt processing temperatures required for use with printed parts printed from model materials which require melt processing temperatures that exceed 200° C. and build environments that may exceed 80° C.

Alternatively, parts printed with, for example ABS model materials, are printed in combination with break-away support materials. Break away support materials can be designed for greater thermal stability at the higher temperatures, but these materials are not soluble in liquids that facilitate support removal. Rather, support structures printed from the break-away support materials are typically heated to a moderate temperature and physically broken apart from the corresponding printed parts. While these break-away support materials are suitable for many applications, they do not provide the capability of an automated or hands-free removal process that is achievable with soluble support materials. Additionally, in some cases, the physical removal of the break-away support materials can prevent printed parts from having critical or delicate geometrical features, such as features that can engage one another (e.g., gear engagements), or highly-complex interior cavities and pockets. The disclosed geometric features are exemplary and are not limiting in nature.

The support materials of the present disclosure, however, are uniquely engineered for pairing with model materials (e.g., same/similar glass transition temperatures) in high temperature build environments, e.g. at least about 80° C. or greater, while also being able to disintegrate in aqueous solutions at about neutral pH, e.g. tap water, without the need for the inclusion of caustic basic solutions for sufficient disintegration. The aqueous solution of the present disclosure can be slightly basic or slightly acidic, for example between about a pH of 5 and about a pH of 9. The support materials can disintegrate in aqueous solution, e.g. tap water, at about neutral pH and does not require the presence of a basic or acidic environment or heating of the aqueous solution. The support material can have improved toughness and improved dissolution rates in the aqueous solution for hands-free removal.

The soluble support materials described herein advantageously are disintegrable in tap water and in addition, can be melt processed (e.g., melted and extruded from a print head) at temperatures of about 180° C. or greater and used in high temperature build environments of greater than about 80° C. without exceeding their thermal-degradation kinetics thresholds (TDKTs). Accordingly, the support material can be melted and extruded from a print head (or with any other suitable additive manufacturing process) in a layer-by-layer manner in coordination with a model material with no appreciable thermal degradation or distortion.

The TDKT is a time-temperature parameter that defines a rate of thermal degradation of a polymeric material, such as by depolymerization, backbone chain scission, pendant-group stripping, polymer cross linking, and/or oxidation processes. The thermal degradation of a support material can reduce the desired physical properties of the material, such as changing the glass transition temperature, dissolution characteristics, physical appearance, adhesive properties, and the like. These effects can prevent the degraded support material from functioning as a sacrificial support structure.

The TDKT reaction rate typically follows the first-order Arrhenius equation, which is substantially linear with time and exponential with temperature. As an example, for a support material exposed to a selected elevated temperature for a selected duration, increasing the exposure temperature by a small amount (e.g., about 10° C.) or reducing the exposure duration by about 50% (e.g., doubling the flow rate) may net about the same thermal reaction rates on the support material, although the particular net thermal effects may vary depending on the support material composition.

In a fused deposition modeling process, the duration component of the TDKT for a support material is typically the time required to melt and extrude the support material from a print head. This can range from about 3-10 seconds, but can be longer in some cases, such as 90-120 seconds. These durations, along with the lower melt processing temperatures, allow the current soluble support materials to be printed while remaining below their TDKTs. As such, soluble support structures may be printed without significant thermal degradation. This is also in addition to any melt processing required for filament production, which can also expose the support material to elevated temperatures for 30-120 seconds, for example.

A further benefit of the soluble support materials of the present disclosure are their ability to exhibit a heat distortion temperature (HDT) in excess of 90° C. During the printing process, a heated build environment is used when the model material and the support material are deposited in a layer by layer manner. An exemplary heated build environment, e.g. a chamber, in a fused deposition modeling system is described below. As layers of model and support material are deposited upon each other during printing, the support material preferably does not flow, bend, or creep and can maintain strong adhesion to the model material such that distortion of the model is minimized A large value of the HDT of the support material can reduce the excessive distortions and/or curling of the support material in the high temperature build environment.

As discussed further below, the support material compositionally includes a polymeric matrix. The support material may also include one or more additives that include a rheology modifying additive, an impact modifier, an elastomer and the like. The polymeric matrix includes a thermoplastic polymer or copolymer derived from polymerization of monomers of vinyl pyrrolidone. The polymeric matrix of the support material in the present disclosure generally includes polyvinylpyrrolidone (PVP). The support material can include a blend of at least two species of PVP polymers of different average molecular weights. This support material has sufficient thermal stability to withstand build environments in additive manufacturing applications of about 80° C. or greater. The support material has improved toughness to withstand the forces exerted on support materials in additive manufacturing applications in conjunction with desirable dissolution rates in water or aqueous solutions or dispersions for removal of the support material from the printed 3D part.

In some embodiments, support materials for high temperature build environments are support materials for printing at temperatures greater than about 80° C., preferably greater than about 120° C. The support materials may also be used in build environments less than 80° C. and these are within the scope of this disclosure. The support materials, for example, may be compatible with ABS, acrylonitrile styrene acrylate (ASA), polylactic acid (PLA), polycarbonate (PC), blends of PC and ABS (PC-ABS) and polyamide. Other model materials may also be compatible with these support materials and are within the scope of the present disclosure. In addition, the solubility of the support material is sufficient for use of removal of the support material in an automated process or hands-free manner in aqueous solutions or dispersions, e.g. water, as described below.

The support material of the present disclosure may be configured for use with several different additive manufacturing techniques, such as extrusion-based additive manufacturing systems, high-speed sintering systems, selective laser sintering systems, electrophotography-based additive manufacturing systems, and the like. Further, the use of the disclosed material is not limited to additive manufacturing. As shown in FIG. 1, system 10 is an example of an extrusion-based additive manufacturing system for printing or otherwise building 3D parts and support structures using a layer-based, additive manufacturing technique, where the support structures may be printed from the support material of the present disclosure. Suitable extrusion-based additive manufacturing systems for system 10 include fused deposition modeling systems developed by Stratasys, Inc., Eden Prairie, Minn. under the trademark "FDM".

In the illustrated embodiment, system 10 includes chamber 12, platen 14, platen gantry 16, print head 18, head gantry 20, and consumable assemblies 22 and 24. Chamber 12 is an enclosed environment that contains platen 14 for printing printed parts and support structures. Chamber 12 may be heated (e.g., with circulating heated air) to reduce the rate at which the part and support materials solidify after being extruded and deposited.

Alternatively, the heating may be localized rather than in an entire chamber 12. For example, the deposition region may be heated in a localized manner Example techniques for locally-heating a deposition region include heating platen 14 and/or with directing heat air jets towards platen 14 and/or the printed parts/support structures being printed). The heating anneals the printed layers of the printed parts (and support structures) to partially relieve the residual stresses, thereby reducing curling of the printed parts and support structures.

Platen 14 is a platform on which printed parts and support structures are printed in a layer-by-layer manner. In some embodiments, platen 14 may also include a flexible polymeric film or liner on which the printed parts and support structures are printed. In the shown example, print head 18 is a dual-tip extrusion head configured to receive consumable filaments from consumable assemblies 22 and 24 (e.g., via guide tubes 26 and 28) for printing printed part 30 and support structure 32 on platen 14. Consumable assembly 22 may contain a supply of a model material, such as a high-performance model material, for printing printed part 30 from the model material. Consumable assembly 24 may contain a supply of a support material of the present disclosure for printing support structure 32 from the given support material.

Platen 14 is supported by platen gantry 16, which is a gantry assembly configured to move platen 14 along (or substantially along) a vertical z-axis. Correspondingly, print head 18 is supported by head gantry 20, which is a gantry assembly configured to move print head 18 in (or substantially in) a horizontal x-y plane above chamber 12.

In an alternative embodiment, platen 14 may be configured to move in the horizontal x-y plane within chamber 12, and print head 18 may be configured to move along the z-axis. Other similar arrangements may also be used such that one or both of platen 14 and print head 18 are moveable relative to each other. Platen 14 and print head 18 may also be oriented along different axes. For example, platen 14 may be oriented vertically and print head 18 may print printed part 30 and support structure 32 along the x-axis or the y-axis.

System 10 also includes controller 34, which is one or more control circuits configured to monitor and operate the components of system 10. For example, one or more of the control functions performed by controller 34 can be implemented in hardware, software, firmware, and the like, or a combination thereof. Controller 34 may communicate over communication line 36 with chamber 12 (e.g., with a heating unit for chamber 12), print head 18, and various sensors, calibration devices, display devices, and/or user input devices.

System 12 and/or controller 34 may also communicate with computer 38, which is one or more computer-based systems that communicates with system 12 and/or controller 34, and may be separate from system 12, or alternatively may be an internal component of system 12. Computer 38 includes computer-based hardware, such as data storage devices, processors, memory modules, and the like for generating and storing tool path and related printing instructions. Computer 38 may transmit these instructions to system 10 (e.g., to controller 34) to perform printing operations.

Figure 2:
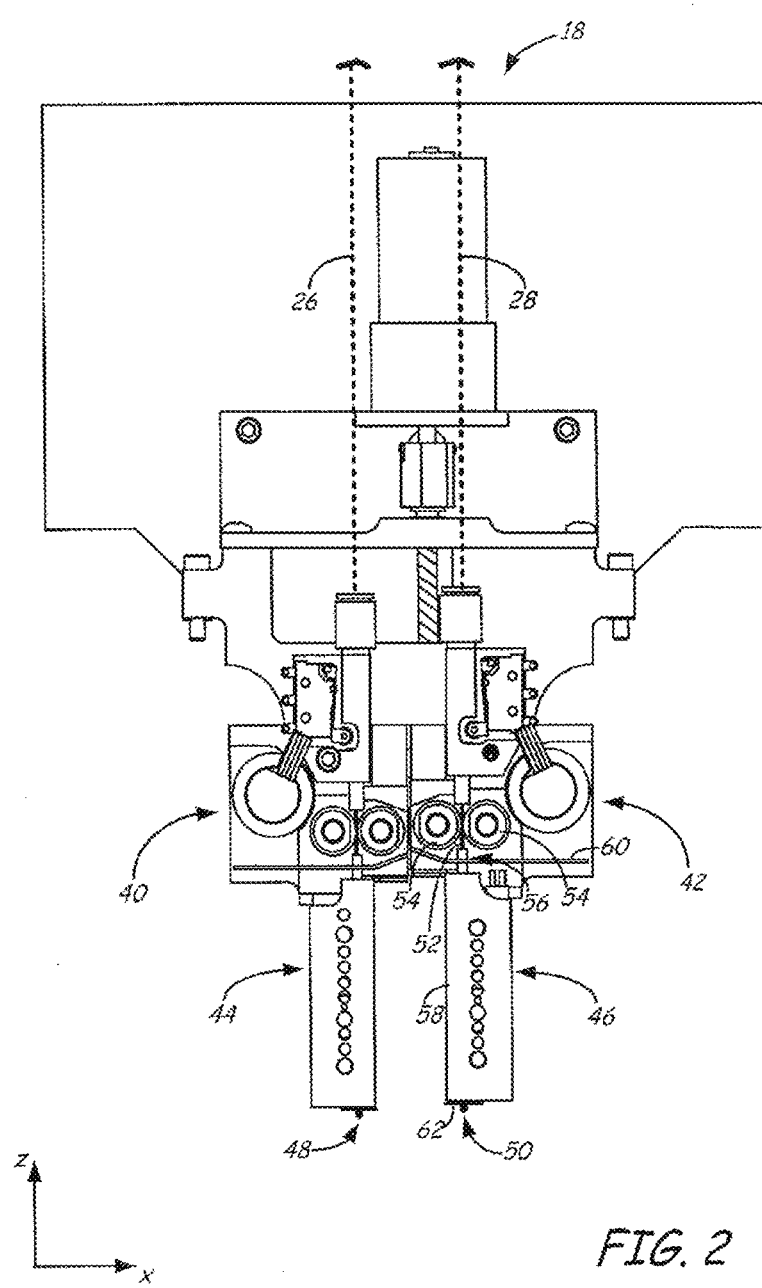
FIG. 2 is a front view of a print head of the extrusion-based additive manufacturing system.

FIG. 2 illustrates a suitable device for print head 18, as described in Leavitt, U.S. Pat. No. 7,625,200. Additional examples of suitable devices for print head 18, and the connections between print head 18 and head gantry 20 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Leavitt, U.S. Pat. No. 7,625,200; Batchelder et al., U.S. Pat. No. 7,896,209; and Comb et al., U.S. Pat. No. 8,153,182. In additional embodiments, in which print head 18 is an interchangeable, single-nozzle print head, examples of suitable devices for each print head 18, and the connections between print head 18 and head gantry 20 include those disclosed in Swanson et al., U.S. Pat. Nos. 8,419,996 and 8,647,102.

Figure 3:
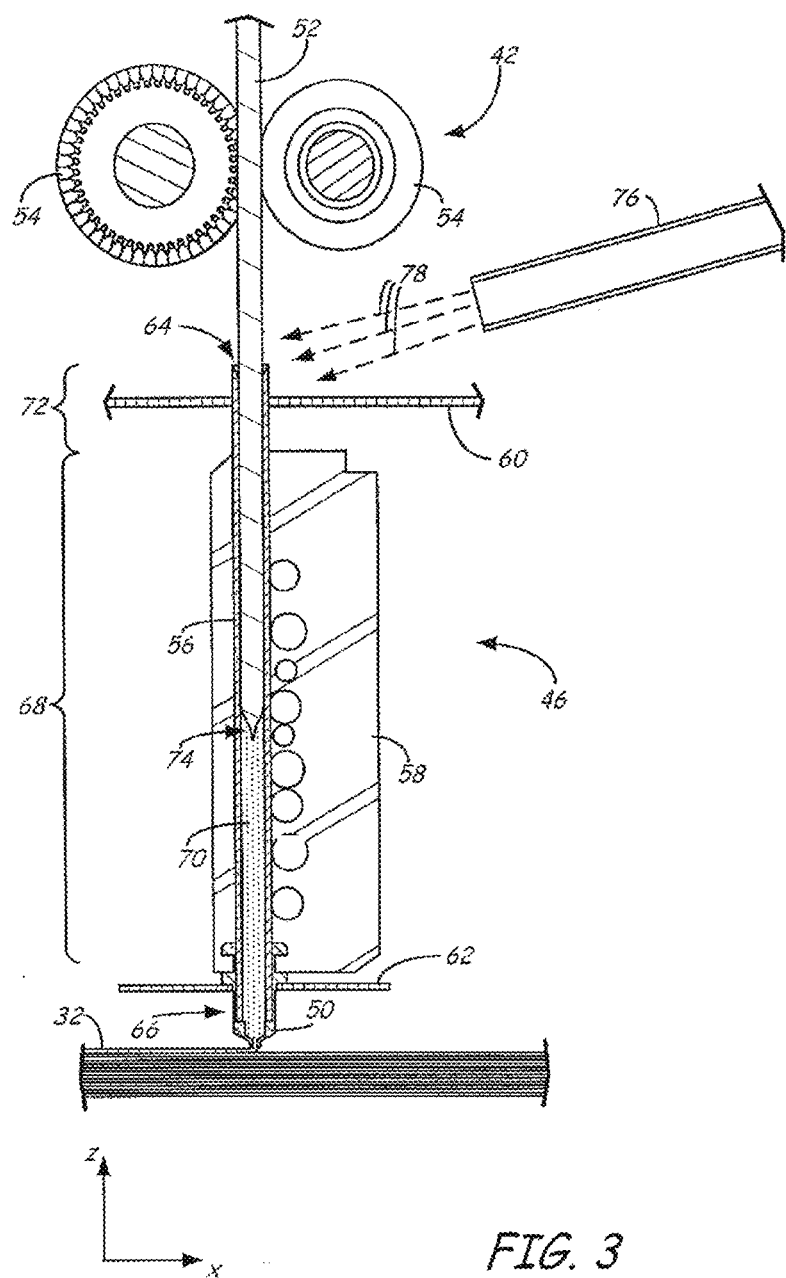
FIG. 3 is an expanded sectional view of a drive mechanism, a liquefier assembly, and a nozzle of the print head for use in the extrusion-based additive manufacturing system.

In the shown dual-tip embodiment, print head 18 includes two drive mechanisms 40 and 42, two liquefier assemblies 44 and 46, and two nozzles 48 and 50, where drive mechanism 40, liquefier assembly 44, and nozzle 48 are for receiving and extruding the model material, and drive mechanism 42, liquefier assembly 46, and nozzle 50 are for receiving and extruding the support material of the present disclosure. In this embodiment the model material and the support material each preferably have a filament geometry for use with print head 18. For example, as shown in FIGS. 2 and 3, the support material may be provided as filament 52.

During operation, controller 34 may direct wheels 54 of drive mechanism 42 to selectively draw successive segments filament 52 (of the support material) from consumable assembly 24 (via guide tube 28), and feed filament 52 to liquefier assembly 46. Liquefier assembly 46 may include liquefier tube 56, thermal block 58, heat shield 60, and tip shield 62, where liquefier tube 56 includes inlet end 64 for receiving the fed filament 52. Nozzle 50 and tip shield 62 are accordingly secured to outlet end 66 of liquefier tube 56, and liquefier tube 56 extends through thermal block 58 and heat shield 60.

While liquefier assembly 46 is in its active state, thermal block 58 heats liquefier tube 56 to define heating zone 68. The heating of liquefier tube 56 at heating zone 68 melts the support material of filament 52 in liquefier tube 56 to form melt 70. Preferred liquefier temperatures for the support material range will vary depending on the particular polymer composition of the support material, and are preferably above the melt processing temperature of the support material, while also allowing the support material to remain below its TDKT for the expected residence time in liquefier tube 56.

The upper region of liquefier tube 56 above heating zone 68, referred to as transition zone 72, is preferably not directly heated by thermal block 58. This generates a thermal gradient or profile along the longitudinal length of liquefier tube 56.

The molten portion of the support material (i.e., melt 70) forms meniscus 74 around the unmelted portion of filament 52. During an extrusion of melt 70 through nozzle 50, the downward movement of filament 52 functions as a viscosity pump to extrude the support material of melt 70 out of nozzle 50 as extruded roads to print support structure 32 in a layer-by-layer manner in coordination with the printing of printed part 30. While thermal block 58 heats liquefier tube 56 at heating zone 68, cooling air may also be blown through an optional manifold 76 toward inlet end 64 of liquefier tube 56, as depicted by arrows 78. Heat shield 60 assists in directing the air flow toward inlet end 64. The cooling air reduces the temperature of liquefier tube 56 at inlet end 64, which prevents filament 52 from softening or melting at transition zone 72.

In some embodiments, controller 34 may servo or swap liquefier assemblies 44 and 46 between opposing active and stand-by states. For example, while liquefier assembly 46 is servoed to its active state for extruding the support material to print a layer of support structure 32, liquefier assembly 44 is switched to a stand-by state to prevent the model material from being extruded while liquefier assembly 46 is being used. After a given layer of the support material is completed, controller 34 then servoes liquefier assembly 46 to its stand-by state, and switches liquefier assembly 44 to its active state for extruding the model material to print a layer of printed part 30. This servo process may be repeated for each printed layer until printed part 30 and support structure 32 are completed.

While liquefier assembly 44 is in its active state for printing printed part 30 from a model material filament, drive mechanism 40, liquefier assembly 44, and nozzle 48 (each shown in FIG. 2) may operate in the same manner as drive mechanism 42, liquefier assembly 46, and nozzle 50 for extruding the model material. In particular, drive mechanism 40 may draw successive segments of the model material filament from consumable assembly 22 (via guide tube 26), and feed the model material filament to liquefier assembly 44. Liquefier assembly 44 thermally melts the successive portions of the received model material filament such that it becomes a molten model material. The molten model material may then be extruded and deposited from nozzle 48 as a series of roads onto platen 14 for printing printed part 30 in a layer-by-layer manner in coordination with the printing of support structure 32.

After the print operation is complete, the resulting printed part 30 and support structure 32 may be removed from chamber 12. Support structure 32 may then be sacrificially removed from printed part 30, such as by dissolution in an aqueous solution, aqueous dispersion or tap water. Examples of suitable removal units for dissolving or disintegrating support structure 32 include those disclosed in Swanson et al., U.S. Pat. No. 8,459,280. Using support removal methodology, support structure 32 may at least partially disintegrate in the aqueous solution or dispersion, separating it from printed part 30 in a hands-free manner.

As mentioned above, the support material of the present disclosure compositionally includes a polymeric matrix, preferably including a thermoplastic polymer(s) or copolymer(s). The support material can include the polymeric matrix and optionally, one or more additives to form a water soluble support material. In an embodiment, the support material includes the thermoplastic polymer, polyvinylpyrrolidone (PVP). The support material may include only PVP polymers as the polymeric matrix. Alternatively, the polymeric matrix may be a copolymer that includes PVP polymers along with other polymers that may act as rheology modifiers, impact modifiers and elastomers. Other polymers can be, for example, polyethylene oxide and glycol-based polymers; methyl vinyl ether and maleic acid-based polymers; polyoxazoline-based polymer; acrylic or methacrylic acid based polymers; water soluble polyamides; water soluble polyvinylalcohols; polyvinyl acetates; water soluble polyesters and the like.

The support material compositionally can include PVP polymers and optionally, one or more additives as described below. Vinyl pyrrolidone monomers are polymerized to form PVP polymers having the following structure:

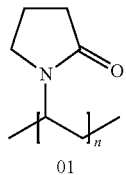

(Formula 1)

where "n" is the number of repeating vinyl pyrrolidone monomer units, which varies depending on the desired molecular weight of the PVP polymer.

The polymeric matrix of the support material generally includes at least one species of a PVP polymer. The polymeric matrix of the support material can include at least two different species of PVP polymers, i.e. at least two PVP polymers with different average molecular weights or different molecular weight ranges. The polymeric matrix may also include multiple different species of PVP polymers of different average molecular weights.

The polymeric matrix of the present disclosure can include at least one species of PVP polymers having a weight average molecular weight greater than about 9,000 daltons and preferably a PVP polymers species having a weight average molecular weight greater than about 50,000 daltons. In more preferred embodiments, the support material includes at least one species of PVP polymers of greater than about 1,400,000 daltons on average. In an exemplary embodiment, the support material includes PVP polymer species having an average molecular weight of about 1,450,000 daltons. Average molecular weights greater than about 1,450,000 daltons may also be used in the polymeric matrix and are all within the scope of this disclosure.

When two or more species of PVP polymers are used, each of the species having the desired average molecular weight are first obtained and then the two or more species of PVP polymers are combined or blended during the process of making the support material. One or more of the species of the PVP polymers may also be blended with an additive or other components that are to be included in the support material.

The amount of the PVP polymers in the support material can vary and can be dependent on the desired use. Generally, the amount of PVP polymers in the support material is less than about 95% by weight of the support material. Preferably the amount of the PVP polymers in the support material is between about 50% by weight and about 95% by weight of the support material, more preferably between about 60% by weight and about 80% by weight of the support material. In an exemplary embodiment, the support material includes about 75% by weight of the PVP polymers.

As described above, the polymeric matrix may include two species of PVP polymers that are miscible with each other. In these embodiments, at least one of the species of PVP polymers has a weight average molecular weight of about 40,000 daltons or greater. In embodiments having two or more species of PVP polymers, the first species of PVP polymer can include PVP polymers with a weight average molecular weight of about 40,000 daltons or greater and the second species of PVP polymer can include PVP polymers with a weight average molecular weight of about 450,000 daltons or less. In other words, if two or more species of PVP polymers are present, at least one of the species of PVP polymers has an average molecular weight of about 40,000 daltons or greater and at least one of the species of PVP polymers has a weight average molecular weight of about 450,000 daltons or lower. Embodiments that include two or more of the PVP polymer species wherein all of the PVP polymer species have a weight average molecular weight between about 40,000 daltons and about 450,000 daltons are also within the scope of the disclosure.

In embodiments having two species of PVP polymers, a first species of PVP polymer has a weight average molecular weight of 40,000 daltons or greater, preferably has a weight average molecular weight of about 450,000 daltons or greater and more preferably, a weight average molecular weight of 1,000,000 daltons or greater. In these embodiments, a second species of PVP polymer has a weight average molecular weight of about 450,000 daltons or lower, preferably has a weight average molecular molecular weight of about 100,000 daltons or lower and more preferably about 50,000 daltons or lower.

In one exemplary formulation of the support material, the polymeric matrix can include PVP polymers having a weight average molecular weights of about 1,400,000 daltons and about 50,000 daltons. Prior to forming the support material, particles of PVP polymers having a weight average molecular weight of about 1,400,000 daltons can be combined or blended with particles of PVP polymers having a weight average molecular weight of about 50,000 daltons. The combined or blended particles of PVP polymers, i.e. the support material mixture, may be processed to form the support material as described below. One or more additives may optionally be added to the support material mixture prior to processing to form the support material.

In some embodiments, the polymeric matrix may include three or more species of the PVP polymers. In embodiments with three or more PVP polymer species, the first and second PVP polymers can be processed as described above. Any subsequent species of PVP polymers, e.g. third species, fourth species and so forth, can be of any desired weight average molecular weight. The number of species of PVP polymers and the molecular weight of the PVP polymer species can vary and are selected based on the desired properties of the support material.

In addition to functioning as part of the polymeric matrix, PVP polymers having a weight average molecular weight of less than about 450,000 daltons may also modify the properties such as rheological properties of the support material or the higher molecular weight PVP polymers. PVP polymers having a weight average molecular weight of less than about 450,000 daltons may be referred to herein as modifying-PVP polymers. Preferably, the modifying-PVP polymers have an average molecular weight of about 50,000 daltons or lower and more preferably, about 10,000 daltons. The support material preferably includes at least one modifying-PVP polymer. The support material may include more than one modifying-PVP polymer. When the polymeric matrix includes two or more PVP polymers, the lower molecular weight PVP polymer species can be the modifying-PVP polymer and acts to modify the properties of the higher molecular weight PVP polymer species.

Selection of the particular blend of PVP polymers species in the polymeric matrix can be dependent on the desired thermal properties of the support material in a desired build environment. The molecular weight or average molecular weight of the PVP polymers can affect the glass transition temperature ($T_g$) and the HDT. The $T_g$ and HDT of the support material increases as the average molecular weight of the PVP polymers in the support material increases. The addition of the modifying-PVP polymers and/or increasing the percentage of the modifying-PVP polymers in the support material can lower the $T_g$ and HDT of the support material in a particular build environment. Preferably, the decrease in the $T_g$ and HDT in a particular build environment by the inclusion of modifying-PVP polymers is balanced with improved rheological properties. The inclusion of modifying-PVP polymers can influence the flow characteristics of the support material leading to an improved printing process. Inclusion of modifying-PVP polymers may aid in dissolution rates in aqueous solutions or other desirable properties.

Without being bound by any theory, higher molecular weight PVP polymers generally contribute to the integrity of the polymeric matrix due to the larger size. Lower molecular PVP polymers are included for modification of rheological properties. Thus, incorporation of the lower molecular weight PVP polymers within the polymeric matrix improves the flow characteristics of the support material for printing parts during additive manufacturing. Inclusion of the lower molecular weight PVP polymers however, lowers the $T_g$ and HDT. Selection of the blend of PVP polymers can balance the need for support material that has a higher Tg and HDT but maintains desirable rheological properties.

As described above, when the support materials include three or more PVP polymers, at least one of the PVP-polymer species has a molecular weight greater than about 40,000 daltons. In addition, at least one of the other PVP-polymers is a modifying-PVP polymer that has a lower average molecular weight than the first PVP polymer species. The other PVP polymers that may be present in the support material may or may not function as a modifying-PVP and may be utilized, for example, to incorporate other compounds into the polymeric matrix.

The support material can optionally include one or more additives. The additives can be, for example, rheology modifiers, impact modifiers, elastomers and combinations thereof. The support material may also include additives such as colorants, fillers, plasticizers, surfactants, reinforcing materials (e.g. fibers, microspheres, platelets), polymer stabilizers (e.g., antioxidants, light stabilizers, ultraviolet absorbers, and antiozonants), biodegradable additives, and combinations thereof. Other additives may also be added that do not reduce the thermal stability, the HDT, or disintegration in water of the support material and are within the scope of the invention.

The support material generally includes a rheology modifier. Rheology modifier can be any polymer and/or compound that modify the thermal characteristics and flow characteristics and may increase the toughness of the polymeric matrix described herein. Rheology modifiers can be polymers and/or plasticizers. Rheology modifiers can be, for example, low viscosity anionic polymers, citrates, polyethylene glycol (PEG) and/or polypropylene glycol (PPG) and their copolymers, fatty acid esters, fatty acid amides, phthalate plasticizers, vinyl acetate polymers and copolymers, polyamides, polyesters, waxes, wax esters, amide waxes, polyol esters, silicone polymers, metal soaps, polyalkylene glycols, functionalized naturally occurring oils. and the like. Non-limiting examples of polyalkylene glycols include polyethylene glycols sold under the CARBOWAX® tradename by Dow Chemical Co. located in Midland, Mich. Non-limiting examples of functionalized naturally occurring oils include: malinated or epoxidized soybean, linseed or sunflower oils, which are commercially available from Cargill, Inc. located in Minnetonka, Minn.

In some exemplary embodiments, the rheology modifier is a modifying-PVP polymer that can provide the desired rheological properties to the higher molecular weight PVP polymers. Other rheology modifiers in addition to the modifying-PVP polymers may also be included in the matrix. Modifying-PVP polymers, when used as a rheology modifier generally have an average molecular weight of less than about 450,000 daltons, preferably about 50,000 daltons or less.

Rheology modifying additives can also be plasticizers. Plasticizers can include, but are not limited to, dialkyl phthalates, cycloalkyl phthalates, benzyl and aryl phthalates, alkoxy phthalates, alkyl/aryl phosphates, polyglycol esters, pyrrolidones, adipate esters, citrate esters, esters of glycerin, and combinations thereof. Exemplary rheology modifying additives include monofunctional propylene glycol, 2-Pyrrolidone, vinyl acetate and tributyl citrate.

The support material may include rheology modifiers of at least about 2% by weight of the support material. In some preferred embodiments, the amount of the rheology modifiers is between about 5% by weight and about 25% by weight. The amount of the rheology modifiers in the support material can be dependent on the desired characteristics of the support material. In embodiments that include plasticizers, preferred concentrations of the plasticizers in the support material range from about 5% to about 20% by weight.

The support material can also include one or more impact modifiers as an additive. In embodiments that include impact modifiers, preferred concentrations of the impact modifiers in the support material are less than about 20% by weight. More preferred concentrations include impact modifiers at about 15% by weight or less of the support material. In an exemplary embodiment, the concentration of the impact modifier is about 10% by weight. Support materials without an impact modifiers or with concentrations of greater than about 20% by weight may also be suitable and are within the scope of the description.

Suitable impact modifiers preferably increase the toughness of the support material, thereby increasing the strength of the support material feedstock and the resulting support structure without adversely affecting the disintegration of the support material in an aqueous solution or dispersion. Suitable impact modifiers for use with the PVP polymers include, but are not limited to, block copolymer impact modifiers, core-shell impact modifiers, polydimethylsiloxane (PDMS) based modifiers, polybutadiene polymers, polyamides, room temperature vulcanized (RTV) silicones, thermoplastic vulcanizates, thermoplastic elastomers and the like.

Suitable impact modifiers can also include epoxy-functional polyolefins (e.g., polyethylenes and polypropylenes). Suitable epoxy-functional polyethylenes include copolymers of ethylene monomer units and epoxy monomer units that include epoxy-terminated carboxylate ester groups. Preferred impact modifiers include copolymers of ethylene, and glycidyl methacrylate, and optionally one or more alkyl (meth)acrylates such as butyl acrylate. Suitable impact modifiers are not limited to the above disclosure. Other suitable impact modifiers are known and are within the scope of the present disclosure.

Core-shell impact modifiers usually consist of a core having engineered thermoplastics or elastomers grafted with a second component. The core-shell impact modifiers can be, for example, acrylic core shell modifiers. Suitable block copolymers include copolymers of acrylic monomers, such as methyl methacrylate and butyl acrylate. Blocks of methyl methacrylate monomer provide thermal stability and modulus to the polymer, while blocks of butyl acrylate provide toughness and elasticity. In addition, polar monomers, such as acrylic acid or acrylonitrile may be added to the block copolymer to increase polarity and compatibility with PVP polymer. Examples of acrylic block copolymers include the product line from Arkema, Inc. located in King of Prussia, Pa. having the NANOSTRENGTH® and DURASTRENGTH® tradenames and the product line from Kuraray Co., Ltd. located in Kurashiki City, Japan under the KURARITY® tradename. In some embodiments, the core-shell impact modifier can be of the type methacrylate-butadiene-styrene (MBS). Examples of MBS impact modifiers include the product line from Arkema, Inc. located in King of Prussia, Pa. having the CLEARSTRENGTH® tradename. Commercially available examples of both acrylic core-shell and MBS core-shell impact modifiers can be also be found in the products under the PARALOID™ tradename from Dow Chemical Company of Midland, Mich.

The support material can also include an elastomer as an additive. Suitable elastomers may also act as impact modifiers and include the elastomeric compounds disclosed herein. Elastomers can aid in reducing the brittleness of the support material and enable the support material, e.g. a filament, to traverse the pathway within the printing system with diminished or no breakage. Elastomers, however, can change the properties of the support material such as $T_g$ and HDT. The amount of elastomers included can balance the need for reduced brittleness while maintaining the desired properties of $T_g$ and HDT.

Elastomers that can be included are, for example, polyamides and elastomeric copolyesters, polyalkylene glycols and functionalized naturally occurring oils. Examples of elastomeric polyesters include, but are not limited to, those sold under the NEOSTAR® tradename by Eastman Chemical Co., located in Kingsport, Tenn., the BIOMAX® tradename by E.I. du Pont de Nemours and Company located in Wilmington, Del. and the Hytrel® tradename by E.I. du Pont de Nemours and Company located in Wilmington, Del. Non-limiting examples of polyalkylene glycols include polyethylene glycols sold under the CARBOWAX® tradename by Dow Chemical Co. located in Midland, Mich. Non-limiting examples of functionalized naturally occurring oils include: malinated or epoxidized soybean, linseed or sunflower oils, which are commercially available from Cargill, Inc. located in Minnetonka, Minn.

Suitable elastomers can include water and/or alcohol soluble polyamides. Suitable water and/or alcohol soluble polyamides include the AQ Nylon products from Toray Industries Inc. of Tokyo, Japan. In a preferred embodiment, the elastomer includes less than 25% by weight of a water soluble polyamide, and in a more preferred embodiment includes less than 20% of a water soluble polyamide. Suitable elastomers can also include epoxy-functional polyolefins (e.g., polyethylenes and polypropylenes). Suitable epoxy-functional polyethylenes include copolymers of ethylene monomer units and epoxy monomer units that include epoxy-terminated carboxylate ester groups. Preferred elastomers include copolymers of ethylene, and glycidyl methacrylate, and optionally one or more alkyl (meth)acrylates such as butyl acrylate. However, in some embodiments, the impact modifier includes less than 5% by weight of alkyl (meth)acrylates, and in further embodiments is substantially free of, or completely free of, alkyl (meth)acrylates (e.g., butyl acrylate).

When elastomers are included in the support material, the elastomers may be directly combined or blended into the support material mixture. Alternatively, the elastomer can be pre-compounded with a PVP polymer prior to blending with the support material mixture. PVP polymers are capable of chemical reaction or complex formation with acidic compounds, in particular hydrogen donors such as phenols or carboxylic acids. The pre-compounding process may be used to control the extent of reaction or complex formation between additives and the PVP polymer. In an exemplary embodiment, the elastomer is pre-compounded with a modifying-PVP polymer prior to blending with the support material mixture.

The amount of elastomer in the support material can be between about 1 percent by weight and about 25 percent by weight. Preferably, the amount of elastomer in the support material is between about 5 percent by weight and about 20 percent by weight. It is also contemplated that the support material includes no elastomer.

In embodiments that include colorants, preferred concentrations of the colorants in the support material range from about 0.1% to about 5% by weight. Suitable colorants include titanium dioxide, barium sulfate, carbon black, and iron oxide, and may also include organic dyes and pigments. It is also contemplated that the support material contain no colorants.

In embodiments that include fillers, preferred concentrations of the fillers in the support material range from about 1% to about 75% by weight. Suitable fillers include, but not limited to, calcium carbonate, magnesium carbonate, glass spheres, graphite, carbon black, carbon fiber, glass fiber, talc, wollastonite, mica, alumina, silica, kaolin, silicon carbide, zirconium tungstate, zinc oxide, soluble salts, e.g. sodium chloride and combinations thereof. It is also contemplated that the support material contain no fillers.

The support materials of the present description can include a blend of PVP polymers. In some embodiments, the support materials can include between about 20 percent by weight and about 80 percent by weight of PVP polymers greater than about 450,000 daltons on average. In other embodiments, the support materials can include between about 50 percent by weight and about 80 percent by weight of PVP polymers greater than about 450,000 daltons on average.

In alternative embodiments, the support materials can include between about 20 percent by weight and about 80 percent by weight of PVP polymers greater than about 1,000,000 daltons on average. Preferably, the support materials can include between about 50 percent by weight and about 75 percent by weight of PVP polymers greater than about 1,000,000 daltons on average.

In other alternative embodiments, the support materials include between about 20 percent by weight and about 80 percent by weight of PVP polymers greater than about 1,400,000 daltons on average. Preferably, the support materials can include between about 40 percent by weight and about 60 percent by weight of PVP polymers greater than about 1,400,000 daltons on average.

In some embodiments, the support materials can include between about 5 percent by weight and about 50 percent by weight of PVP polymers less than about 450,000 daltons on average. Preferably, the support materials include between about 5 percent by weight and about 40 percent by weight of PVP polymers less than about 450,000 daltons on average.

In some preferred embodiments, the support materials include between about 5 percent by weight and about 50 percent by weight of PVP polymers less than about 50,000 daltons on average. In some more preferred embodiments, the support materials include between about 5 percent by weight and about 50 percent by weight of PVP polymers less than about 10,000 daltons on average.

In the embodiments including the above-discussed additional additives, the thermoplastic polymer or copolymer may constitute from about 25% to about 95% by weight of the support material, and more preferably from about 60% to about 75% by weight. In some embodiments, the support material may consist essentially of the thermoplastic polymer or copolymer, and optionally, one or more elastomers and/or impact modifiers.

In some embodiments, the blend of the PVP polymers may be selected to attain a desired glass transition temperature or HDT for a specific heated build environment. For instance, a blend of PVP polymers may be controlled to achieve a glass transition temperature ranging from between about 110° C. and about 140° C., or greater than about 140° C. The combination of PVP polymers and additives, for example rheology modifiers and plasticizers, can furthermore be controlled to achieve a glass transition temperature or HDT suitable for build environments of greater than about 80° C., preferably greater than about 120° C.

The blend of PVP polymers in the support materials are also preferably balanced such that the melt processing temperatures are compatible with the model materials and are suitable for melt processing temperatures greater than about 120° C. and/or greater than about 240° C.; more preferably greater than about 250° C., greater than about 275° C., and/or greater than about 300° C.; and in some embodiments, greater than about 350° C.

When used in system 10, the support material requires sufficient thermally stability to be melted in liquefier tube 56 and extruded from nozzle 50 without appreciable thermal degradation, which can expose the support material to a melt processing temperature for durations of 3-10 seconds, or longer in some cases (e.g., 5 seconds, 10 seconds, 30 seconds, 1 minute, 5 minutes, 10 minutes, 30 minutes, and the like). Preferably, the support material is printable with an additive manufacturing system (e.g., system 10) such that less than 10% by weight of the thermoplastic copolymer thermally degrades during the printing operation. More preferably, less than 5% by weight, even more preferably less than 1% by weight, and even more preferably less than 0.5% by weight of the thermoplastic copolymer thermally degrades during the printing operation.

As mentioned above, in some embodiments, chamber 12 may be heated to one or more elevated temperatures. Preferably, the temperature within chamber 12 is set such that a temperature at the build plane below print head 18 is held within about 30° C. below an average or bulk glass transition temperature of the part and support materials (which are preferably similar or the same), more preferably within about 25° C. the average or bulk glass transition temperature, and even more preferably within about 20° C. below the average or bulk glass transition temperature. Examples of suitable set point temperatures for chamber 12 include those greater than about 80° C., greater than 120° C., greater than about 150° C., and/or about 180° C.

With respect to the solubility of the support material, it is readily capable of being disintegrable in aqueous solutions. The aqueous solutions may have a pH of less than about 9. The aqueous solution may be between about pH 6 and about pH 8. Preferably, the aqueous solution is about pH 7. In a preferred embodiment, the aqueous solution is tap water. Therefore, in addition to being a high-temperature support material, it can also be removed in a hands-free manner with tap water and/or other aqueous solutions or dispersions. Examples of suitable disintegration rates, pursuant to the Disintegration Test discussed below, include rates of at least about 3.0% by weight/minute, more preferably at least about 3.5% by weight/minute, and even more preferably at least about 4.0% by weight per minute. Furthermore, the aqueous solution is not required to be heated but rather can be utilized at its ambient temperature. In some embodiments, heating of the aqueous solution can be alternatively used to increase the disintegration rate further.

The present description also includes methods of making the support material. The method generally includes blending at least two species of PVP polymers. PVP polymers of a variety of molecular weights are commercially available. Suitable PVP polymers of different molecular weights can be purchased, for example, from BASF SE located in Ludwigshafen, Germany.

In an exemplary embodiment, a support material mixture may be formed by blending or combining the different species of PVP polymers and optionally, one or more additives. The PVP polymers may be in the form of powders, particles, liquids, resins or other forms suitable for combining with other components of the support material mixture.

The support material mixture can then be processed, for example, melt processed to form the support material into a desirable form. The processing, for example, may include subjecting the support material mixture to multiple extrusion cycles in order to ensure blending of all the components. In an exemplary embodiment, the support material mixture is processed by twin-screw extrusion. The resultant support material product may be recovered and dried. The dried, support material may be used directly to form the desired consumable material (e.g. a filament or powder).

The support material may also be formed in multiple steps. For example, some of the components may be pre-compounded first and then the pre-compounded material may be melt processed with the polymeric material and additional polymers and/or additives, impact modifiers, and the like as described herein. Alternatively, all of the components may be combined and melt processed in one step.

In one exemplary embodiment, the elastomer, e.g. polyamide, is pre-compounded with a PVP polymer, preferably a portion or all of the PVP polymer being modifying-PVP polymer. The pre-compounded elastomer/modifying-PVP polymer can then be incorporated into the support material mixture prior to processing by melt processing, extrusion and the like.

The PVP polymers may be blended first prior to incorporation of any additives to form the support material mixture. Alternatively, the PVP polymers and the one or more additives may also be incorporated into a support material mixture in one step. The PVP polymer(s) can also be blended (e.g., compounded) with various concentrations of other thermoplastic polymers to form the support material composition. Support material mixtures with the different concentrations of the modifying-PVP polymers can be used to produce a wide range of blends with differing physical properties and thermal properties to be used at various build temperatures. This can reduce production costs for manufacturing support materials for pairing with different model materials.

Figure 4D:
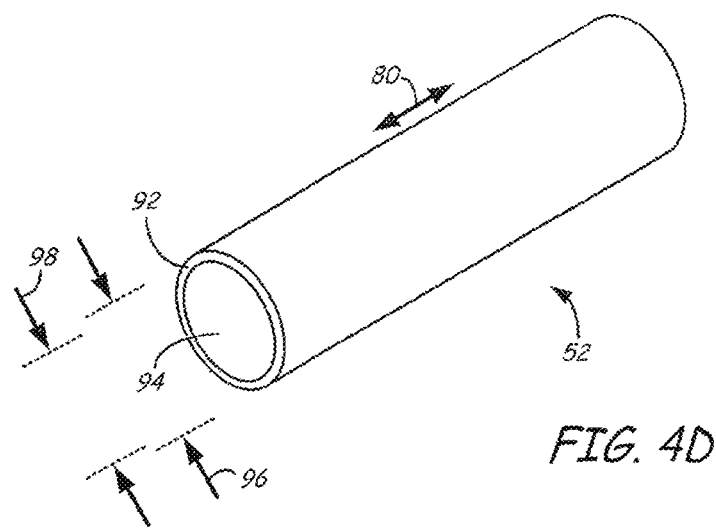
FIG. 4D is a perspective view of a segment of a cylindrical core-shell filament of the support material.

The resulting support material may then be formed into a desired media for use with an additive manufacturing system. For example, the support material may be melt processed and extruded to produce filament 52 for use in system 10. FIGS. 4A-4E illustrate example embodiments for filament 52 produced with the support material of the present disclosure. As shown in FIG. 4A, filament 52 may have a cylindrical or substantially cylindrical geometry, such as those disclosed in Crump, U.S. Pat. No. 5,121,329; Crump et al., U.S. Pat. No. 5,503,785; and Comb et al., U.S. Pat. No. 7,122,246. For example, filament 52 may have a longitudinal length 80 and an average diameter (referred to as diameter 82) along longitudinal length 80. As used herein, the term "average diameter" of a filament (e.g., diameter 82) is an average based on a 100-foot segment length of the filament. Diameter 82 may be any suitable dimension that allows filament 52 to be received by a print head of an additive manufacturing system (e.g., print head 18).

Alternatively, as shown in FIG. 4B, filament 52 may have a non-cylindrical geometry, such as a ribbon filament as disclosed in Batchelder et al., U.S. Pat. No. 8,221,669. It is understood that "ribbon filament" may have a rectangular cross-sectional geometry with right-angle corners and/or with rounded corners such as an elliptical or a round geometry. In these embodiments, suitable liquefier assemblies for liquefier assemblies 44 and 46 (shown in FIG. 2) include those disclosed in Batchelder et al., U.S. Application Publication No. 2011/0074065; and in Swanson et al., U.S. Application Publication No. 2012/0070523.

Furthermore, as shown in FIG. 4C, filament 52 may alternatively have a hollow geometry. In this embodiment, filament 52 may have a longitudinal length 80, an average outer diameter (referred to as outer diameter 88) along longitudinal length 80, and an average inner diameter (referred to as inner diameter 90) along longitudinal length 80.

Figure 4E:
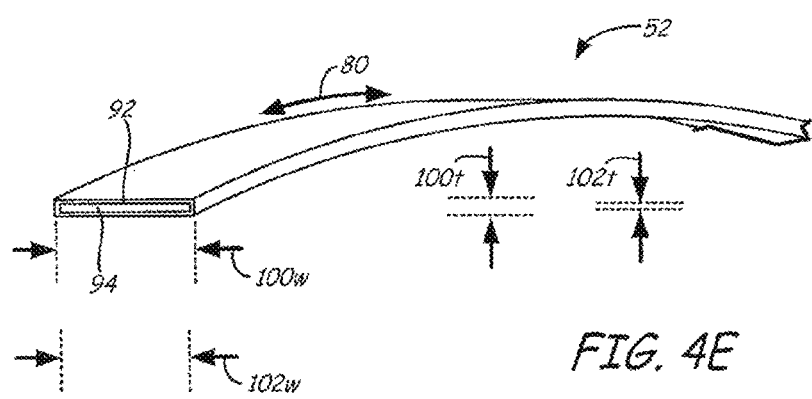
FIG. 4E is a perspective view of a segment of a ribbon core-shell filament of the support material.

Additionally, as shown in FIGS. 4D and 4E, filament 52 may alternatively have a core-shell geometry, as mentioned above, where the support material may be used to form either the core or the shell. For instance, the support material of this embodiment may function as a soluble shell in combination with a bulk core of a second polymer material, such as a second soluble support material having a lower mechanical strength and modulus, but that has a higher dissolution rate in the aqueous solution. Alternatively, the support material may function as a soluble core in combination with a second soluble support material that exhibits exceptional adhesiveness to an associated model material.

In either the cylindrical embodiment shown in FIG. 4D or the ribbon embodiment shown in FIG. 4E, filament 52 may have a longitudinal length 80, a shell portion 92, and a core portion 94, where the shell portion 92 and core portion 94 each preferably extend along longitudinal length 80. In further alternative embodiments, filament 52 may three or more cross-sectional portions (e.g., a core portion and two or more shell portions).

Alternatively, in the ribbon embodiment shown in FIG. 4E, which is a combination of the embodiments shown above in FIGS. 4B and 4D, shell portion 92 may have an average outer width (referred to as outer width 100w) and an average inner width (referred to as inner width 102w) along longitudinal length 80, where inner width 102w corresponds to an outer width of core portion 94. Similarly, shell portion 92 may have an average outer thickness (referred to as outer thickness 100t) and an average inner thickness (referred to as inner thickness 102t) along longitudinal length 80, where inner thickness 102t corresponds to an outer thickness of core portion 94. Examples of suitable core-shell geometries for this embodiment (e.g., widths 100w and 102w, and thicknesses 100t and 102t) include those discussed in Mikulak et al., U.S. Publication Nos. 2012/0070619 and 2012/0231225, and those discussed above for the ribbon filament 52 in FIG. 4B.

Consumable assembly 24 may include any suitable length of filament 52 as illustrated in FIGS. 4A-4E. Thus, longitudinal length 80 for filament 52 in the embodiments shown in FIGS. 4A-4E is preferably about 100 feet or more. In additional embodiments, filament 52 (e.g., as shown in FIGS. 4A-4E) may include topographical surfaces patterns (e.g., tracks) as disclosed in Batchelder et al., U.S. Pat. No. 8,236,227; and/or may include encoded markings as disclosed in Batchelder et al., U.S. Pat. No. 8,658,250.

Figure 5A:
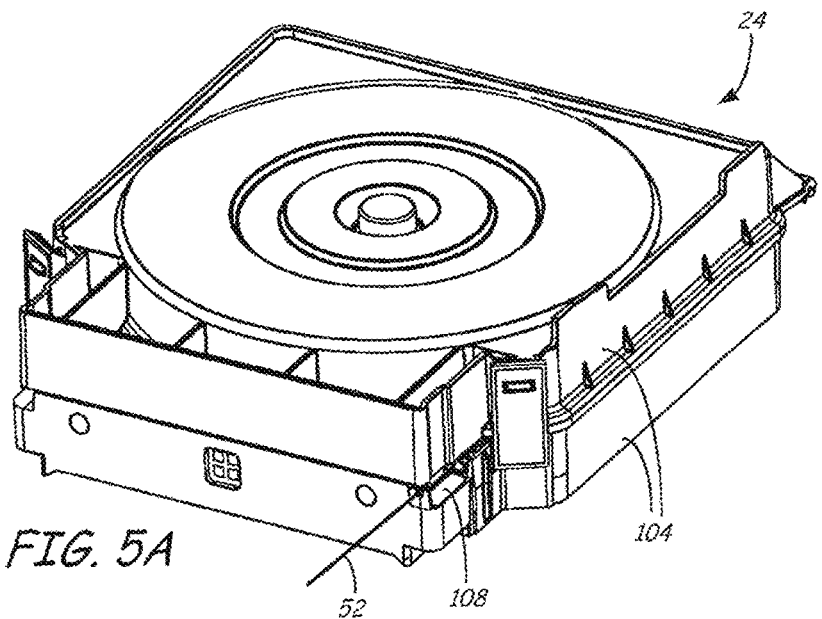
FIG. 5A is a perspective view of a first embodied consumable assembly for retaining a supply of the support material in filament form.
Figure 5B:
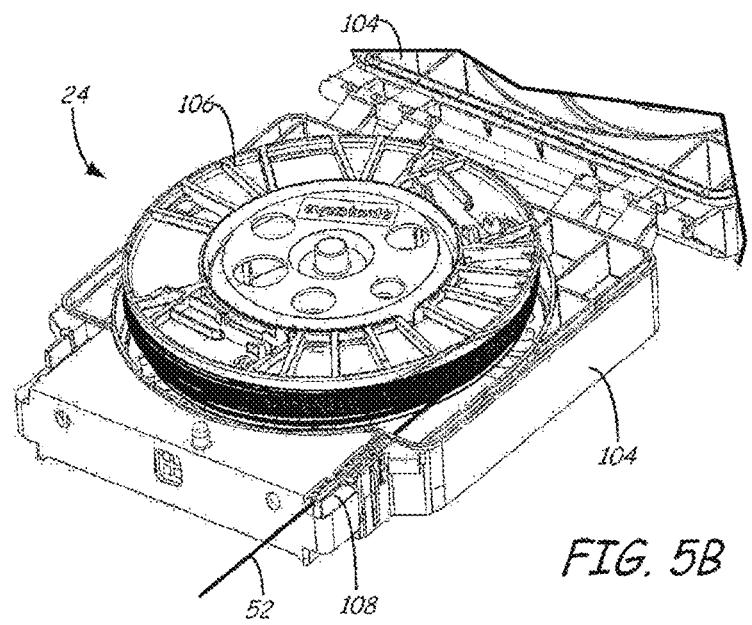
FIG. 5B is a perspective view of the first embodied consumable assembly in an open state, illustrating an interior of the first embodied consumable assembly.

FIGS. 5A-6C illustrate examples of suitable consumable assemblies for consumable assembly 24, which may retain a supply of filament 52 of the support material. For example, FIGS. 5A and 5B illustrates consumable assembly 24 with a container portion 104, spool 106, and guide mechanism 108, where container portion 104 is configured to open and close in a sealing manner as shown to retain spool 106 and guide mechanism 108. Spool 106 accordingly retains a supply of filament 52 of the support material, and relays filament 52 out of consumable assembly 24 via guide mechanism 108.

Figure 6A:
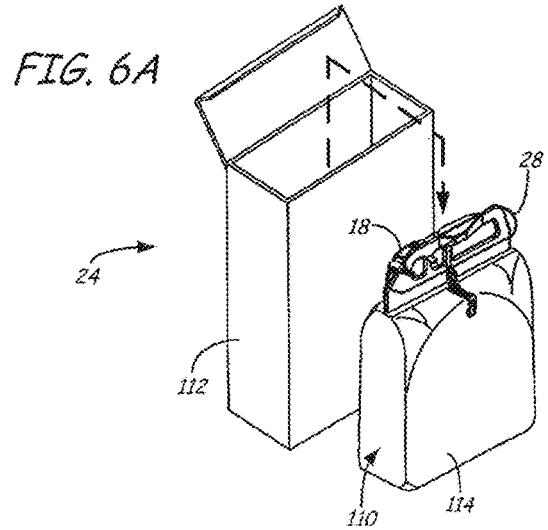
FIG. 6A is a perspective view of a second embodied consumable assembly for retaining a supply of the support material in filament form.
Figure 6B:
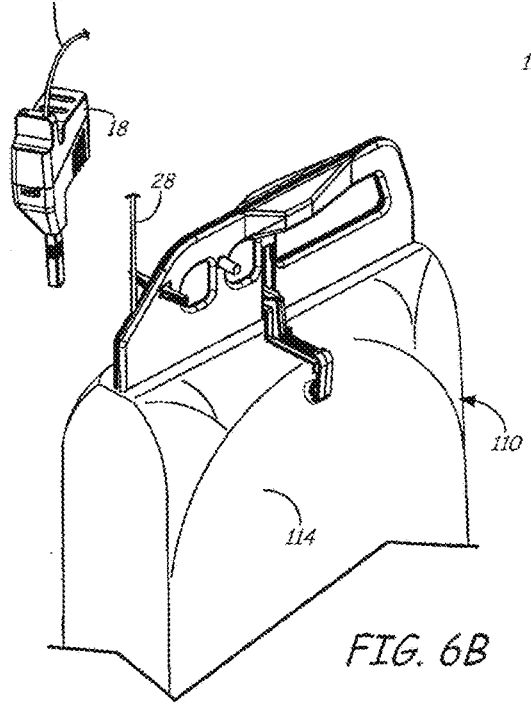
FIG. 6B is an expanded perspective view of the second embodied consumable assembly, illustrating an integrated print head and guide tube.
Figure 6C:
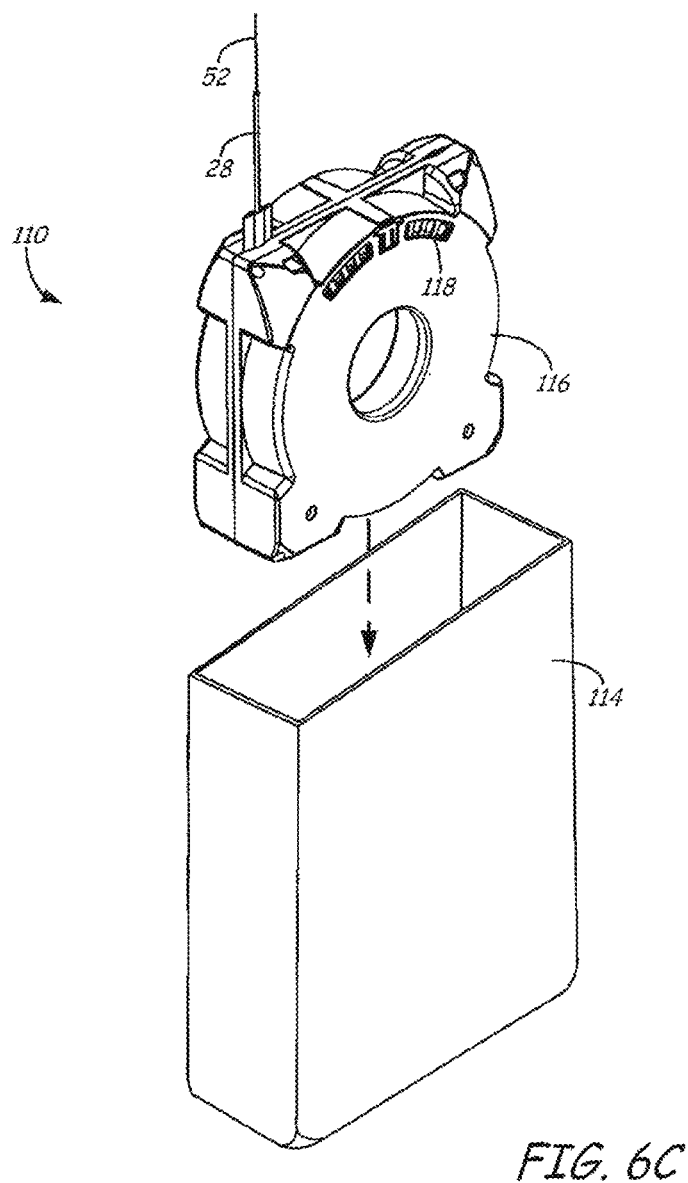
FIG. 6C is a perspective view of a container portion of the second embodied consumable assembly.

FIGS. 6A-6C illustrate an alternative embodiment for print head 18, consumable assembly 24, and guide tube 28, which are combined into a single, removable assembly, such as disclosed in Mannella et al., U.S. Publication Nos. 2013/0161439 and 2013/0161442. As shown in FIG. 6A, in this embodiment, consumable assembly 24 preferably includes container portion 110, which may be retained in a storage box 112, and is configured to mount print head 18 and guide tube 28.

As shown in FIG. 6B, print head 18 and guide tube 28 may be unmounted from container portion 110 and loaded to system 10 such that print head 18 is moveably retained by gantry 20, such as disclosed in Swanson, U.S. Publication Nos. 2010/0283172 and 2012/0164256. As shown in FIG. 6C, container portion 110 may include liner 114, rigid module 116, and spool 118, where spool 118 is rotatably mounted within rigid module 116 and retains a supply of filament 52 of the support material. Rigid module 116 may also be secured within liner 114, which is preferably a moisture and/or gas-barrier liner.

In each of the above-discussed embodiments for consumable assembly 24 (e.g., as shown in FIGS. 5A-6C), the retained supply of filament 52 of the support material is preferably maintained in a dry state, as mentioned above. As such, consumable assembly 24 may be pre-dried and sealed to prevent moisture absorption. Additionally, consumable assembly 24 may include one or more desiccant packs to maintain a dry environment during transportation, storage, and use. In alternative embodiments, the support material may be unsealed and exposed to atmospheric conditions during storage, transportation, and use with system 10.

In each of the above-discussed embodiments for consumable assembly 24 (e.g., as shown in FIGS. 5A-6C), the retained supply of filament 52 of the support material is preferably maintained in a dry state, as mentioned above. As such, consumable assembly 24 may be pre-dried and sealed to prevent moisture absorption. Additionally, consumable assembly 24 may include one or more desiccant packs to maintain a dry environment during transportation, storage, and use. In alternative embodiments, the support material may be unsealed and exposed to atmospheric conditions during storage, transportation, and use with system 10.

In addition to the above-discussed extrusion-based additive manufacturing system, which preferably provides the support material in filament form (e.g., filament 52), the support material may alternatively be provided to an extrusion-based additive manufacturing system in powder form for use in an auger-pump print head, such as disclosed in Bosveld et al., U.S. Publication No. 2013/0333798.

In this embodiment, the support material is preferably pelletized or otherwise micronized and/or classified to attain desired powder particle sizes for use in the auger-pump print head. Examples of suitable average particles sizes for the support material powder range from about 15 micrometers to about 125 micrometers, and in some embodiments from about 20 micrometers to about 50 micrometers.

Moreover, the support material may be provided in powder form for use in other powder-powder-based additive manufacturing systems, such as selective laser sintering systems (e.g., systems disclosed in Deckard, U.S. Pat. Nos. 4,863,538 and 5,132,143), high speed sintering systems, powder/binder systems (e.g., systems disclosed in Sachs et al., U.S. Pat. No. 5,204,055), sand casting systems, electron-beam systems, and the like. Additional systems for the embodiment include those disclosed in Mannella et al., U.S. Pat. No. 8,221,858. In these embodiments, the support material is also preferably pelletized or otherwise micronized and/or classified to attain desired powder particle sizes for use in the particular system.

Electrophotography-Based Additive Manufacturing

In another embodiment, the support material is configured for use in an electrophotography-based additive manufacturing system to print support structures, in association with a model material used to print printed parts, with high resolutions and fast printing rates. Examples of suitable electrophotography-based additive manufacturing systems for this embodiment include those disclosed in Hanson et al., U.S. Publication Nos. 2013/0077996 and 2013/0077997, and Comb et al., U.S. Publication Nos. 2013/0186549 and 2013/0186558.

In electrophotography-based methods, during a printing operation, EP engines may develop or otherwise image each layer of the part and support materials using the electrophotographic process. The developed layers are then transferred via a transfer assembly to a layer transfusion assembly where they are transfused (e.g., using heat and/or pressure) to print one or more printed parts and support structures in a layer-by-layer manner. Accordingly, the support material of the present disclosure is preferably thermally stable while being transfused at a layer transfusion assembly.

As mentioned above, the support material is engineered for use in an electrophotography-based additive manufacturing system to print support structures. As such, the support material may also include one or more materials, e.g. charge control agents and/or heat absorbers, to assist in developing layers with EP engine, to assist in transferring the developed layers from EP engine to layer transfusion assembly, and to assist in transfusing the developed layers with a layer transfusion assembly.

Support Structure Removal

After the printing operation is completed with any of the above-discussed additive manufacturing systems, the resulting printed part and support structure may be removed from the system and undergo one or more post-printing operations. For example, the support structure derived from the support material of the present disclosure may be sacrificially removed from the printed part, such as by using an aqueous solution or dispersion. In some embodiments, the aqueous solution is a solution with a pH of less than about 9. In exemplary embodiments, the aqueous solution or dispersion has a pH of between about 5 and about 9. In other embodiments, the aqueous solution is tap water that can be utilized at ambient temperatures. Under this preferred soluble technique, the support structure may at least partially disintegrate in the aqueous solution or dispersion, separating it from the printed part in a hands-free manner.

In comparison, the model material is typically chemically resistant to aqueous solutions. This allows the use of an aqueous solution or dispersion to be employed for removing the sacrificial support structure without degrading the shape or quality of the printed part. Examples of suitable systems and techniques for removing support structure in this manner include those disclosed in Swanson et al., U.S. Pat. No. 8,459,280; Hopkins et al., U.S. Pat. No. 8,246,888; and Dunn et al., U.S. Publication No. 2011/0186081.

In some preferred embodiments, the disintegrated support structure may also be collected from the aqueous solution and recycled or otherwise discarded in an environmentally-friendly manner More preferably, the support material (or any derivative thereof after being subjected to the aqueous solution) is separated from the aqueous solution, collected, and reformulated as fresh support material for subsequent printing operations.

Property Analysis and Characterization Procedures

Various properties and characteristics of the part and support materials described herein may be evaluated by various testing procedures as described below:

1. Tensile Properties

The tensile properties are determined using the classical ASTM method employing, ASTM Type I, molded specimens undergoing tensile deformation until yield ASTM D638-00 and is reported in MPa for tensile strength; MPa for tensile modulus; and % of length for tensile elongation at yield. The test is performed using a universal mechanical test system operating in tensile mode, commercially available under the trade name "MTS Criterion Model 43" from MTS Systems Corporation, Eden Prairie, Minn. at a nominal strain rate of 0.1 mm/mm-min 2. Izod Impact Resistance The Izod impact resistance is determined using the classical ASTM method employing notched and un-notched, ASTM Type I, molded specimens ASTM D256-02 and is reported in kg-cm/cm. The test is performed using an Izod-type (cantilever beam) impact tester under trade name "TMI Impact Tester" from Testing Machines, Inc. New Castle, Del. using a 2.27 kg pendulum.

3. Melt Flow Index (MFI)

The melt flow index (MFI) is determined using the classical ASTM method employing a melt indexer and pelletized material ASTM D1238-10 and is reported in g/10 min. The test is performed using an extrusion plastometer commercially available under the tradename "MP993A Extrusion Plastometer" from Tinius Olsen Testing Machine Company, Horsham, Pa., operated at 300° C. using 2160 gram mass.

4. Glass Transition Temperature

The glass transition temperature is determined using the classical ASTM method employing Differential Scanning calorimetry (DSC) ASTM D3418-12e1 and is reported in degrees Celsius. The test is performed with a DSC analyzer commercially available under the tradename "DSC 6000" from PerkinElmer, Waltham, Mass. or "DSC 1" from Mettler Toledo, Schwerzenbach, Switzerland, under nitrogen at a heating rate of 10° C./min.

5. Disintegration Rate

The disintegration rate, for measuring the dissolution of a support material copolymer, is determined by initially hot pressing four pellets (0.625-inch diameter and 0.05-inch thickness) at 350° F. and under a 2,000-pound load. The pressed pellets are then vacuum dried at 90° C. for four hours, and each pellet is weighed on an analytical balance. An aqueous solution is then prepared by filling a container with water and stirring with a magnetic stirrer at 70° C. In some embodiments, injection molded ASTM specimens or printed articles may also be used.

Each pellet is then pre-weighed and then placed in the aqueous solution for 3 minutes, 6 minutes, 10 minutes, and 15 minutes (respectively for the four pellets). After each pellet is removed, it is vacuum dried at 90° C. for four hours and weight on an analytical balance to calculate the weight loss for the pellet. The calculated weight loss for each pellet is then plotted against its dissolving time in aqueous solution. A linear relationship is then formed for the polymer, and the slope is determined to be the dissolution rate in the units of percent weight loss per minute (−wt %/min).

6. Thermal Stability

The thermal stability of a support material polymer is measured by thermal gravimetric analysis (TGA) with a TGA system commercially available under the tradename "Q500" from TA Instruments, New Castle, Del., or "TGA 1" from Mettler Toledo, Schwerzenbach, Switzerland under nitrogen, and at a heating rate of 10° C./min. The thermal stability of the support material may be referenced by a weight percentage of thermal degradation over a given exposure duration.

For example, the thermal stability of a given thermoplastic polymer may be characterized such that less than 10% by weight of the thermoplastic polymer thermally degrades when the thermoplastic polymer is exposed to a given melt processing temperature (e.g., 250° C.) for a 10-second duration. Other weight percents may also be referenced, such as less than 5% by weight, less than 1% by weight, and less than 0.5% by weight, and the like; and any suitable duration may be referenced, such as 5 seconds, 10 seconds, 30 seconds, 1 minute, 5 minutes, 10 minutes, 30 minutes, and the like. Combinations of these weight percent and duration references may also be used.

7. Filament Tensile Loop Strength

The breaking strength of a filament is determined using a custom test method developed by Stratasys Ltd, Eden Prairie, Minn. employing a length of filament looped around a stationary fixture and a movable load cell. The filament is elongated in this manner until a break is detected. The peak load at break is reported in joules.

For example, the filament loop strength of a material must be known to determine whether a filament is capable of undergoing the FDM process. Those skilled in the art are capable of determining the necessary limits of filament loop strength required for a known FDM machine such as a Fortus 400mc.

EXAMPLES

The present disclosure is more particularly described in the following examples that are intended as illustrations only, since numerous modifications and variations within the scope of the present disclosure will be apparent to those skilled in the art.

Example 1

The support material included 70% by weight of a polymer matrix (polyvinylpyrrolidone; 1,400,000 daltons SokalanK90 from BASF, Ludwigshafen, Germany), 10% by weight of an impact modifier (acrylic core-shell, for example PARALOID 515 from the Dow Chemical Company, Midland, Mich.) and 20% by weight of an elastomer pre-compound produced from a water and/or alcohol soluble polyamide (P70 AQ Nylon from Toray Industries Inc., Tokyo, Japan), and a rheology modifying PVP polymer (polyvinylpyrrolidone; 50,000 daltons Sokalan K30 from BASF, Ludwigshafen, Germany). The elastomer pre-compound comprised 20% by weight of weight PVP polymer and 80% by weight of water and/or alcohol soluble nylon.

First, materials of the pre-compound elastomer were blended and fed into a 27 mm co-rotating 32:1 L/D twin screw extruder (Micro 27, American Leistritz Extruder Company, Somerville, N.J.) operating at 400 RPM. The temperature profile (° C.) during blend extrusion were as follows: zones 1-8: 180° C., 220° C., 220° C., 260° C., 260° C., 220° C., and a die temperature of 180° C. The blend was then extruded through a 3 hole die onto a belt, cooled by air convection, and pelletized.

Second, materials of the composition including the pre-compound elastomer were then fed into the same 27 mm co-rotating 32:1 UD twin screw extruder operating at 350 RPM for melt processing. The temperature profile (° C.) during extrusion were as follows: zones 1-8: 180° C., 220° C., 260° C., 260° C., 260° C., 260° C., and a die temperature of 260° C. The blend was then extruded through a 3 hole die onto a belt, cooled by air convection, pelletized and then used to create the FDM feedstock, or filament. In an additional evaluation, this material was used to generate ASTM Type I test specimens by injection molding. Test methods for Izod impact resistance, tensile properties, and MFI are given above. Corresponding test data for this example is given in Table 1 below.

TABLE 1

| Test Method | Result | Units |
|---|---|---|
| Tensile Modulus | 2137 | MPa |
| Tensile Strength | 33 | MPa |
| Tensile Elongation at Yield | 2.37 | % |
| Notched Izod Impact | 1.85 | kg-cm/cm |
| Un-Notched Izod Impact | 26.0 | kg-cm/cm |
| Melt Flow Index, 300° C./2160 g | 0.25 | g/10 min |
| Disintegration Rate | 4.16 | Wt %/min |
| Filament Strength at Break | 1.82 | J |

Filament of the support material was made by feeding the pelletized support material composition into a 1.25" single screw, 2.5:1 L/D, extruder (PFEX, Genca Engineering Inc.) operating at 20 RPM. The temperature profile (° C.) during filament extrusion was as follows: zones 1-3: 160° C., 205° C., 250° C., and a die temperature of at least 250° C. The composition was then extruded through a monofilament die, pulled through an air ring, and pulled onto an airframe for cooling. The filament was minimally wound through an airframe and fed through a laser micrometer linked to a pulling system. The extrudate was formed into a substantially uniform cylindrical shape with a consistent diameter of about 1.8 mm. This filament was then wound onto a number of possible spools for future use in various FDM systems.

Figure 7A:
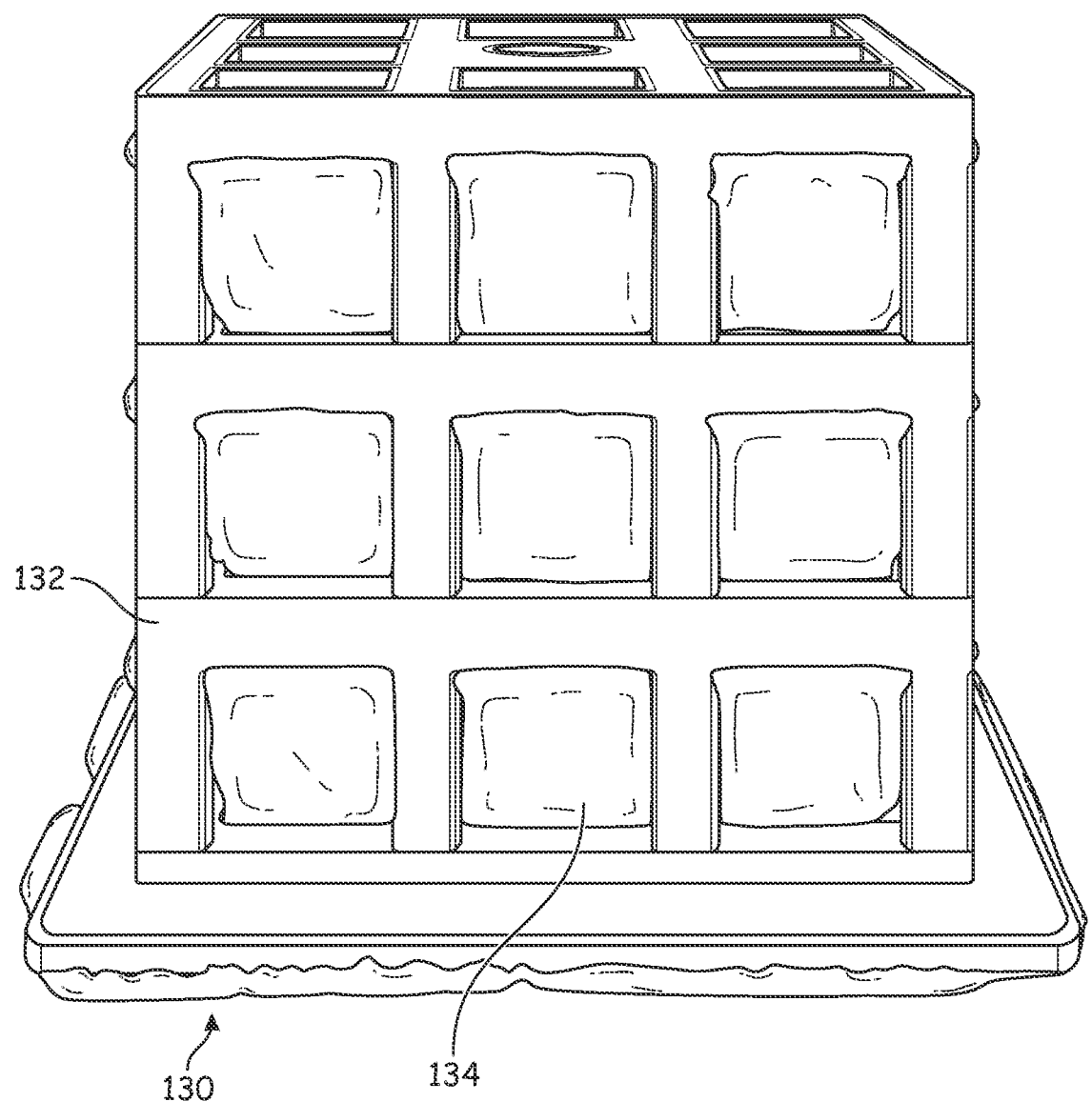
FIG. 7A is a photograph of a printed part with the model material and the support material.
Figure 7B:
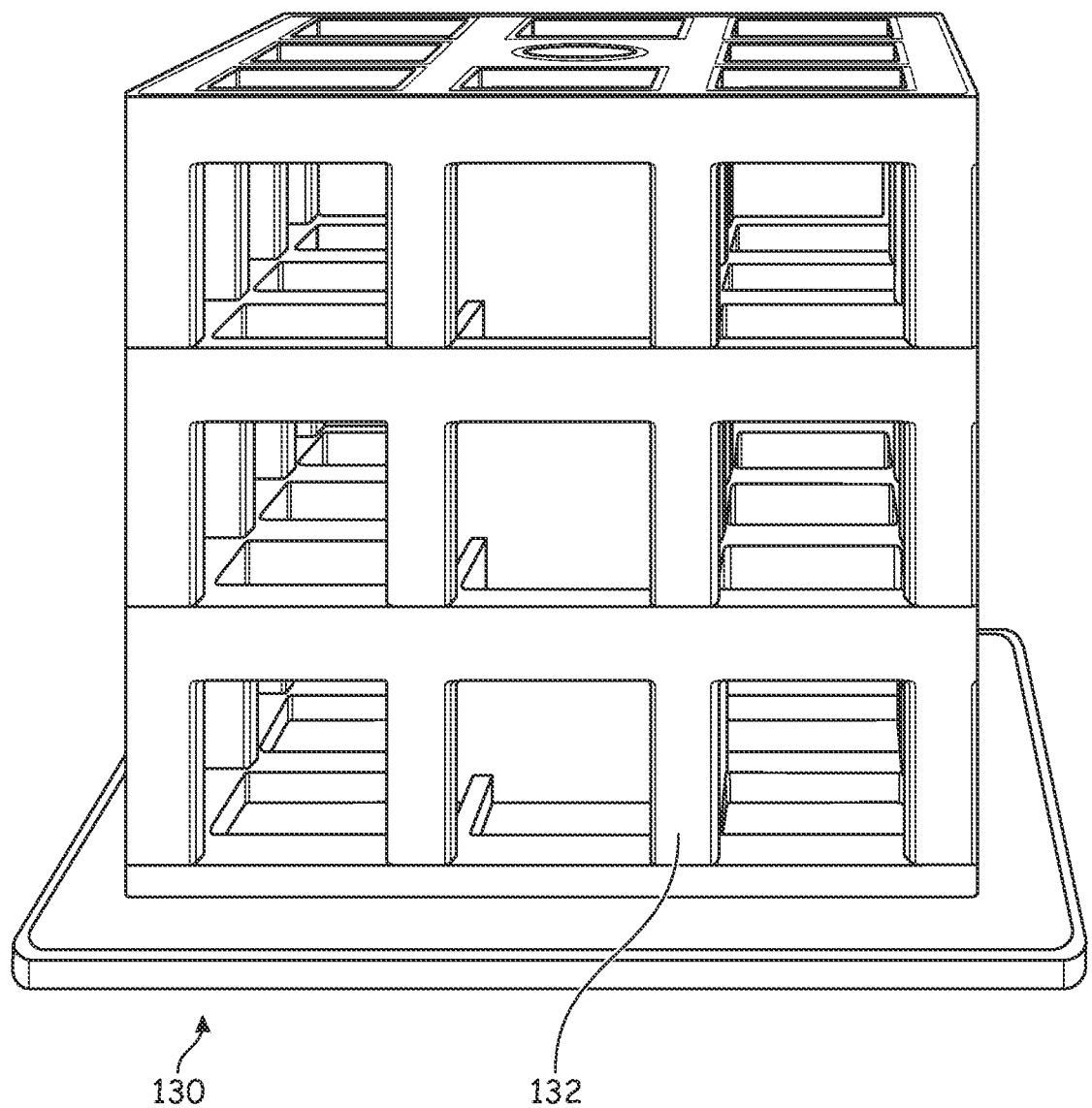
FIG. 7B is a photograph of the printed part of FIG. 7A after the removal of the support material.

The support material with this composition was printed by Fused Deposition Modeling (FDM) using a Stratasys Fortus 400mc printer having a build environment exceeding 80° C. The support material composition was paired with Stratasys ABS M-30 as the model material in a build environment of about 95° C. Adhesion between the model and the support material was sufficient to allow for printing of complex geometries with supported interfaces of overhanging geometries. The support material was subsequently removed from the model composite by dissolution in tap water. Test geometries created with the exemplary formula can be seen in FIG. 7A and FIG. 7B. FIG. 7A is a photograph of a printed part 130 shown with a model material 132 and the support material 134. FIG. 7B is a photograph of the printed part 130 printed with the model material 132 after removal of the support structure. Support removal time for geometry 130 was about 30 minutes in heated tap water at about 70° C. In comparison, the removal time for soluble support material SR30 (Stratasys, Inc., Eden Prairie, Minn.) for the same geometry using commercial EcoWorks solution (Stratasys, Inc., Eden Prairie, Minn.) of about pH 10 is typically 90-120 minutes. It is theorized that this relative increase in rate could be consistent between other geometries.

Figure 8:
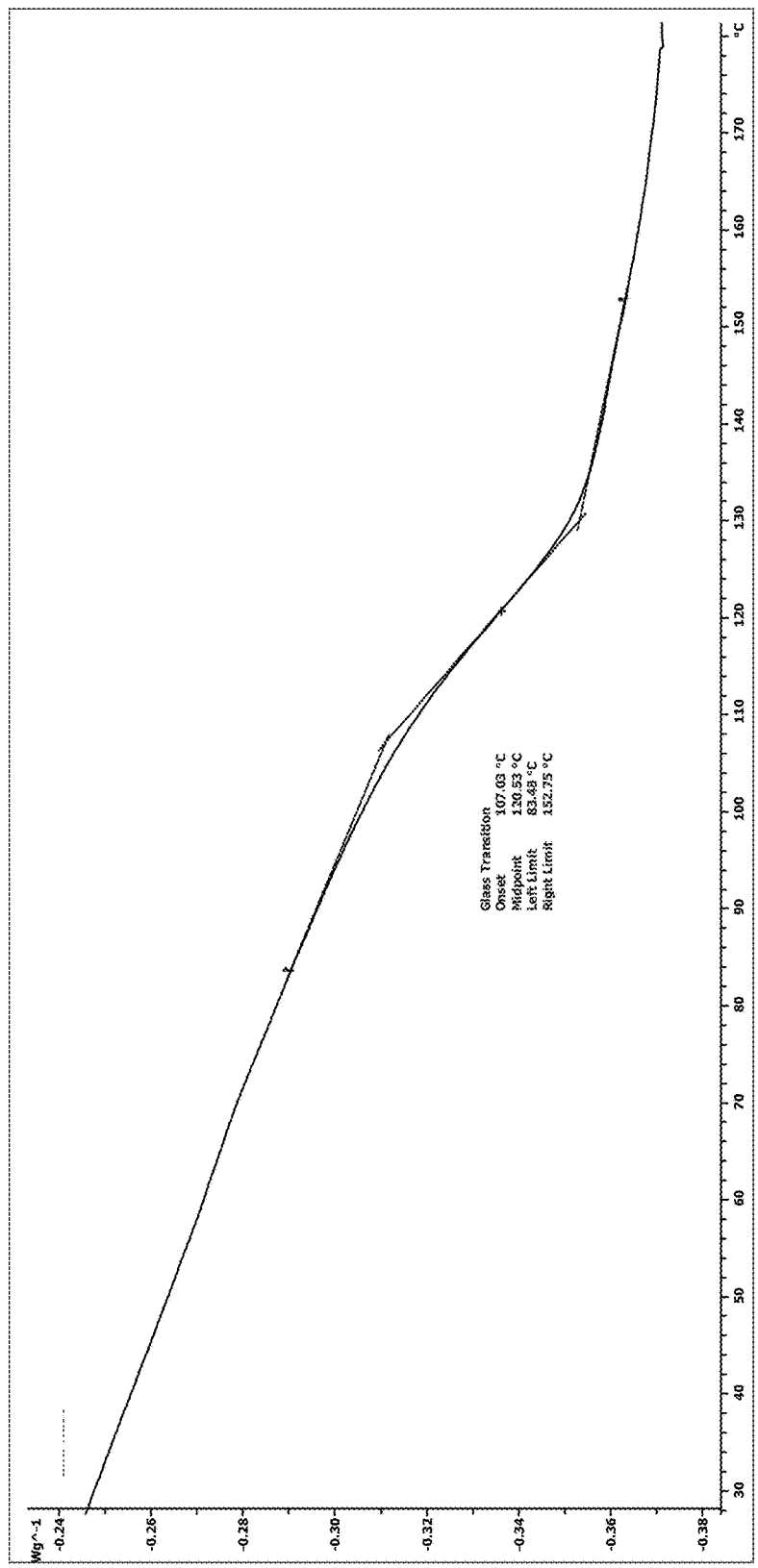
FIG. 8 is a plot from differential scanning calorimetry (DSC) of a PVP support material and identification of the bulk glass transition temperature.

Differential Scanning calorimetry (DSC) was conducted using the methodology as described above in "Glass Transition Temperature" section. FIG. 8 is a DSC plot of the composition of the present Example. The DSC plot indicated a $T_g$ of about 120.5° C.

Figure 9A:
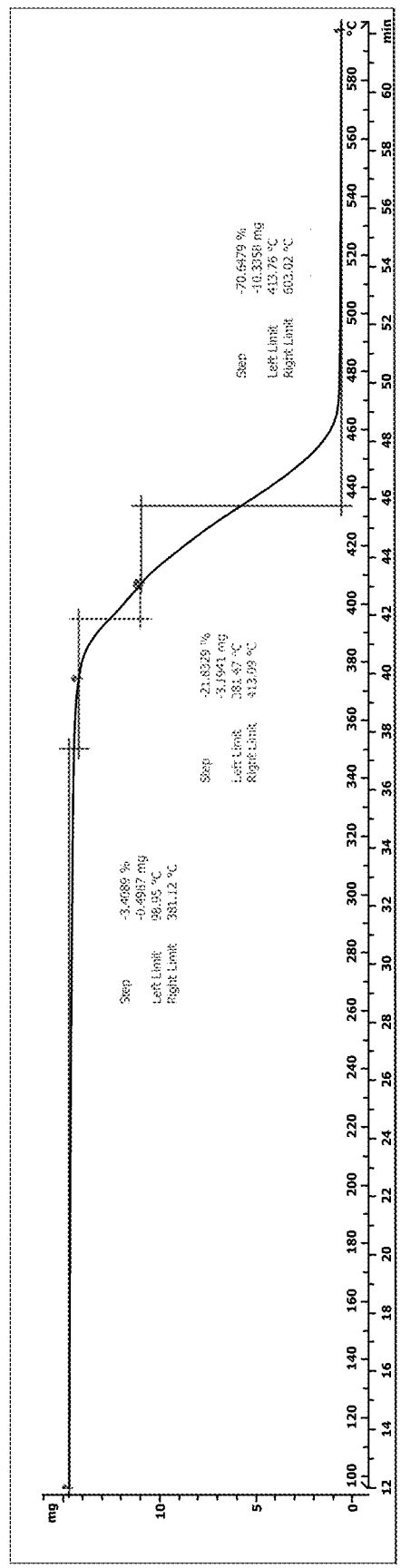
FIG. 9A is a plot of thermal stability by thermal gravimetric analysis (TGA) of a PVP support material.
Figure 9B:
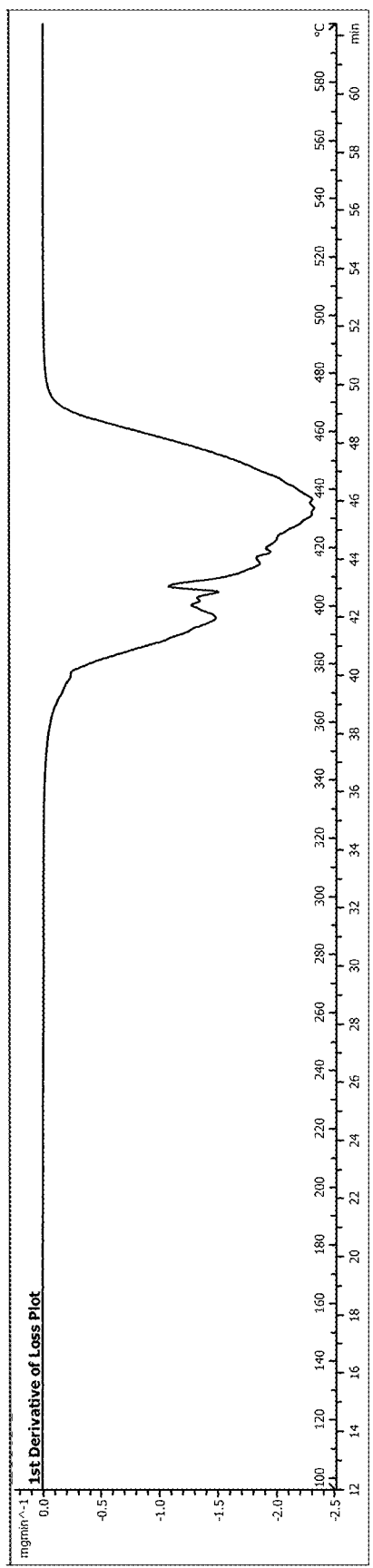
FIG. 9B is a plot of a first derivative of the TGA plot of FIG. 9A.

Thermal gravimetric analysis was conducted as described above in the "Thermal Stability" section. FIG. 9A and FIG. 9B are the TGA plots of the composition of the present Example. FIG. 9A illustrates that the loss of water and volatiles begins at about 360° C. and a 10% reduction in mass occurs at about 395° C. About a 50% reduction in mass occurs at about 435° C. FIG. 9B illustrates the rate of thermal deposition illustrating that thermal decomposition for this material begins at about 360° C. and is complete by about 470° C.

Therefore, the disclosed exemplary formula is particularly suitable for use in FDM additive manufacturing processes at elevated temperatures. The melt flow index (MFI) of the composition is about 0.25 g/10 min at 350° C. The thermal Stability by TGA of the composition is up to about 380° C. Water dissolution rate of the support material in tap water is about 4 wt %/min. Further, removal times for comparable geometries using the support material of this composition can be removed about 2-3 times faster by dissolution in neutral pH tap water, as compared to geometries printed using SR30 dissolved in EcoWorks solution having a pH of 10.

Example 2

The support material included 90% by weight of a polymer matrix (polyvinylpyrrolidone; 1,400,000 daltons Sokalan K90 from BASF, Ludwigshafen, Germany), 10% by weight of an impact modifier (ethylene terpolymer, for example Elvaloy PTW from the DuPont chemical Company, Wilmington, Del.).

Materials of the composition were fed into a 27 mm co-rotating 32:1 L/D twin screw extruder operating at 350 RPM for melt processing. The temperature profile (° C.) during extrusion were as follows: zones 1-8: 180° C., 220° C., 260° C., 260° C., 260° C., 260° C., and a die temperature of 260° C. The blend was then extruded through a 3 hole die onto a belt, cooled by air convection, pelletized and then used to create molded specimens. This material was used to generate ASTM Type I test specimens. Test methods for Izod impact resistance, tensile properties, is given above. Corresponding test data for this example is given in Table 2 below.

TABLE 2

| Test Method | Result | Units |
|---|---|---|
| Tensile Modulus | 3454 | Mpa |
| Tensile Strength | 26.3 | Mpa |
| Tensile Elongation at Yield | 0.89 | % |
| Notched Izod Impact | 2.34 | kg-cm/cm |
| Un-Notched Izod Impact | 30.1 | kg-cm/cm |
| Disintegration Rate | 4.91 | Wt %/min |

Figure 10:
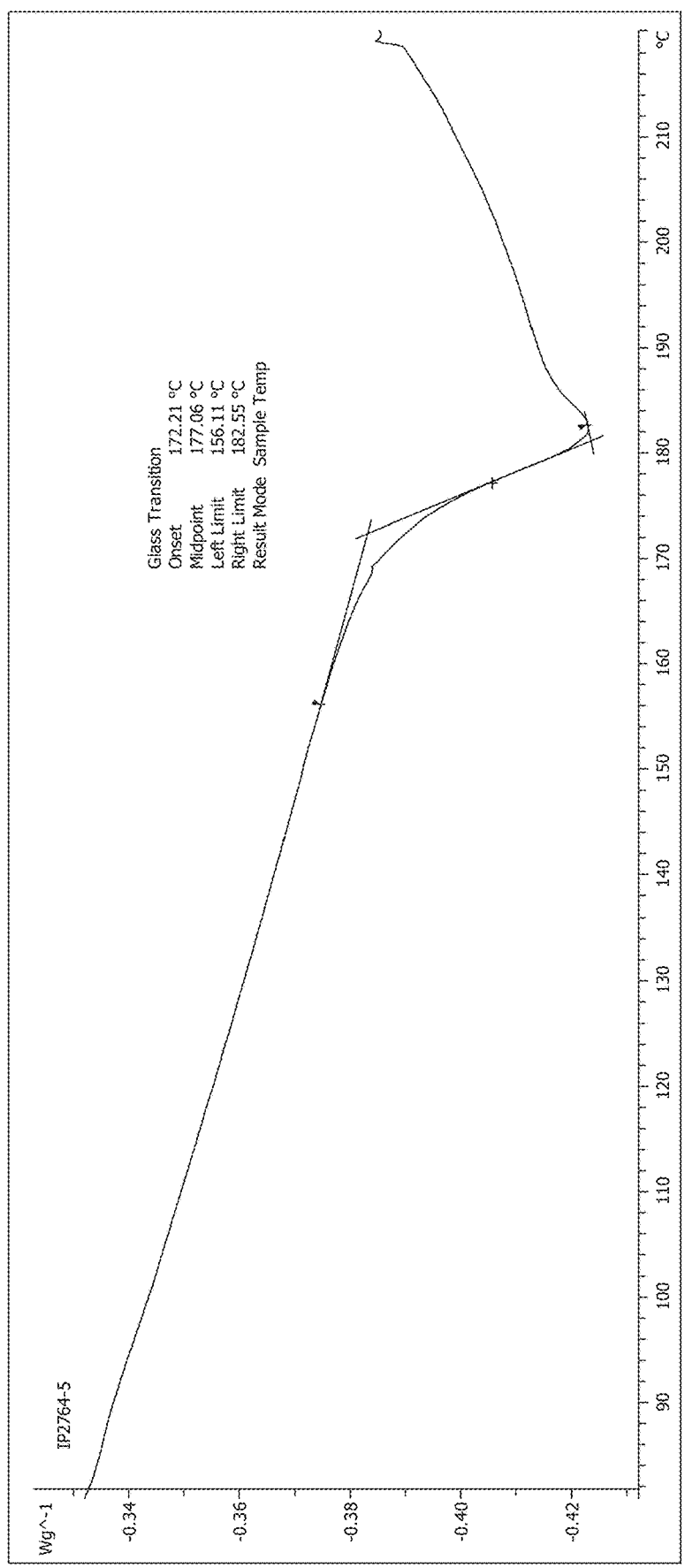
FIG. 10 is a plot from DSC of a PVP support material and identification of the bulk glass transition temperature.

Differential Scanning calorimetry (DSC) was conducted using the methodology as described above in "Glass Transition Temperature" section. FIG. 10 is a DSC plot indicating a $T_g$ of about 179° C.

Figures 11A, 11B:
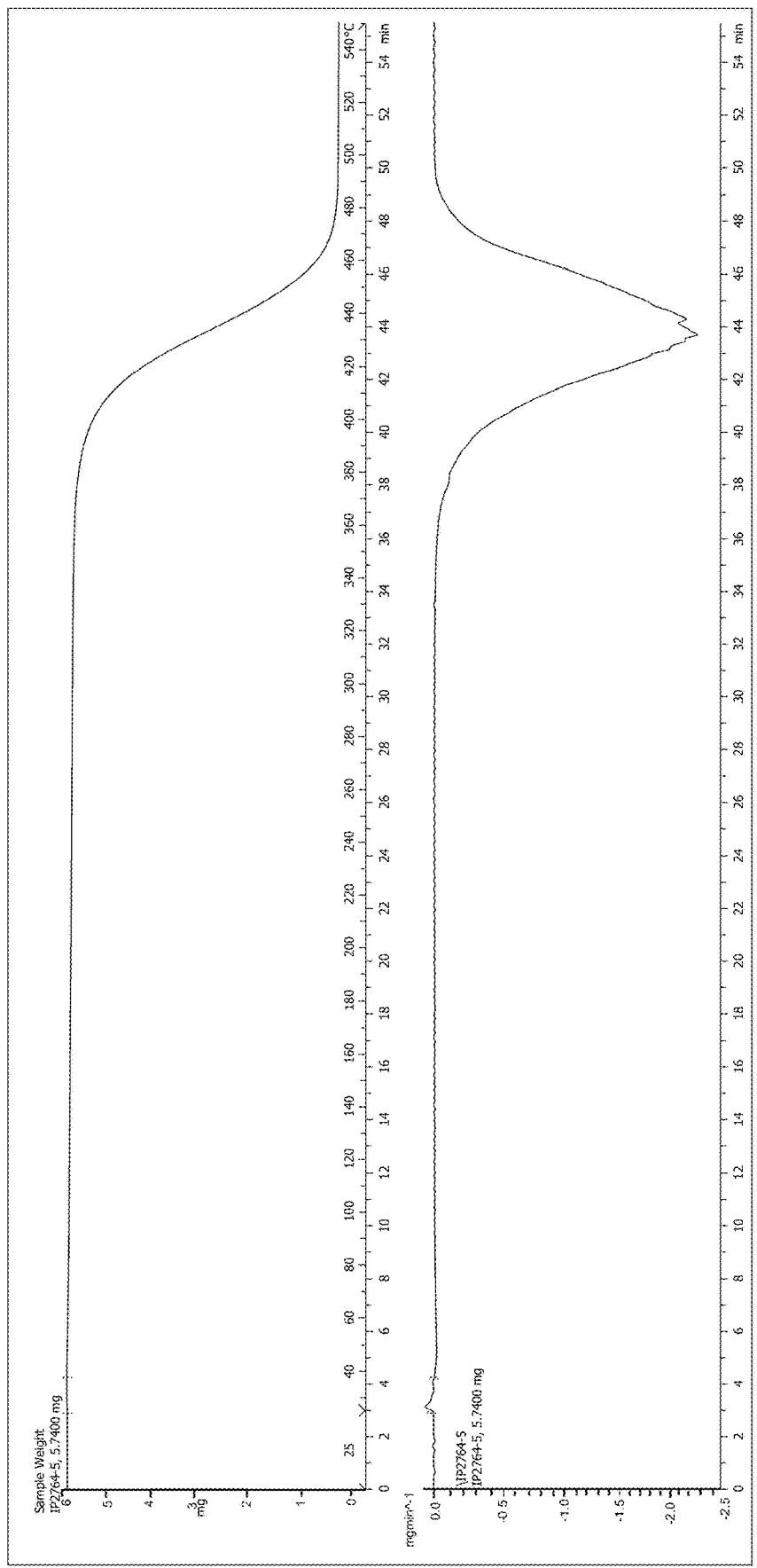
FIG. 11A is a plot of thermal stability by TGA of a PVP support material.
FIG. 11B is a plot of a first derivative of the TGA plot of FIG. 11A.

Thermal gravimetric analysis was conducted as described above in the "Thermal Stability" section. TGA plots are similar to the plots of Example 1. FIG. 11A illustrates that the loss of water and volatiles begins at about 360° C. and a 10% reduction in mass occurs at about 395° C. About a 50% reduction in mass occurs at about 435° C. FIG. 11B illustrates the rate of thermal deposition illustrating that thermal decomposition for this material begins at about 360° C. and is complete by about 470° C.

Therefore, the disclosed formula is particularly suitable for use as a high temperature water soluble material having significant thermal stability and use temperature, as indicated by the glass transition temperature. The dissolution rate of the support material in tap water is about 4.9 wt %/min, as shown in Table 2.

Although the present disclosure has been described with reference to preferred embodiments, workers skilled in the art will recognize that changes may be made in form and detail without departing from the spirit and scope of the disclosure.

The invention claimed is:

1. A water soluble support material for an additive manufacturing system having a build environment, the material comprising:
    a polymeric matrix in a filament configured to be spooled that is compositionally substantially uniform, the polymeric matrix comprising a plurality of PVP polymer species wherein the plurality of PVP polymer species comprises a first PVP polymer species with an average molecular weight of about 450,000 daltons or greater and a second PVP polymer species with an average molecular weight is between about 9,000 daltons and about 450,000 daltons, wherein the support material is disintegrable in an aqueous solution.

2. The material of claim 1 wherein the average molecular weight of the first PVP polymer species is about 450,000 daltons or greater and the average molecular weight of the second PVP polymer species is between about 9,000 daltons and about 100,000 daltons.

3. The material of claim 1 wherein the material further comprises one or more additives, the one or more additives comprising a rheology modifier, an elastomer and/or combinations thereof.

4. The material of claim 1 wherein the material has thermal stability in the build environment maintained at a temperature of about 80° C. or greater.

5. The material of claim 1 wherein the aqueous solution is selected from tap water and an aqueous solution with a pH between about pH 5 and about pH 9.

6. The material of claim 1 wherein the polymeric matrix comprises at least two PVP polymer species wherein the first PVP polymer has an average molecular weight of about 1,400,000 daltons, the second PVP polymer has an average molecular weight of about 50,000 daltons.

7. A water soluble support material for an additive manufacturing system having a build environment, the material comprising:
    a polymeric matrix in a filament configured to be spooled that is compositionally substantially uniform comprising a first PVP polymer species, a second PVP polymer species and an impact modifier, wherein the first PVP polymer species has an average molecular weight of about 450,000 daltons or greater, the second PVP polymer has an average molecular weight of 100,000 daltons or lower and wherein the support material is disintegrable in an aqueous solution.

8. The material of claim 7, wherein the second PVP polymer species has an average molecular weight of about 50,000 daltons or less.

9. The material of claim 7 wherein the material further comprises one or more additives, the one or more additives comprising a rheology modifier, an elastomer and/or combinations thereof.

10. The material of claim 7 wherein the material has thermal stability in the build environment maintained at a temperature of about 80° C. or greater.

11. The material of claim 7 wherein the aqueous solution is selected from tap water and an aqueous solution with a pH between about pH 5 and about pH 9.

12. The material of claim 7 and where in the impact modifier comprises copolymers of ethylene, glycidyl methacrylate, one or more alkyl (meth)acrylates and combinations thereof.

13. A method for printing a three-dimensional part with an additive manufacturing system, the method comprising:
    providing a spool of filament of a support material that is compositionally substantially uniform comprising a plurality of PVP polymer species wherein the first PVP polymer species has an average molecular weight of about 450,000 daltons or greater and a second PVP polymer species with an average molecular weight is between about 9,000 daltons and about 450,000 daltons, wherein the support material is disintegrable in an aqueous solution and provided in a media form suitable for the additive manufacturing system; and
    processing the support material in the additive manufacturing system with a model material.

14. The method of claim 13 wherein the second PVP polymer species has an average molecular weight of less than about 40,000 daltons.

15. The method of claim 13 wherein the support material further comprises one or more additives, the one or more additives comprise a rheology modifier, an impact modifier, an elastomer and combinations thereof.

16. The method of claim 13 wherein the aqueous solution is selected from tap water and an aqueous solution with a pH between about pH 5 and about pH 9.

17. The method of claim 13 wherein the build environment of the additive manufacturing system is maintained at a temperature of about 80° C. or greater.

* * * * *